(12) United States Patent
Silverbrook

(10) Patent No.: US 6,428,147 B2
(45) Date of Patent: Aug. 6, 2002

(54) INK JET NOZZLE ASSEMBLY INCLUDING A FLUIDIC SEAL

(75) Inventor: Kia Silverbrook, Balmain (AU)

(73) Assignee: Silverbrook Research Pty Ltd, Balmain (AU)

( * ) Notice: Subject to any disclaimer, the term of this patent is extended or adjusted under 35 U.S.C. 154(b) by 0 days.

(21) Appl. No.: 09/798,742

(22) Filed: Mar. 2, 2001

Related U.S. Application Data

(63) Continuation-in-part of application No. 09/112,820, filed on Jul. 18, 1998.

(30) Foreign Application Priority Data

Jul. 15, 1997 (AU) .............................................. PO7991
Jun. 8, 1998 (AU) .............................................. PP3985

(51) Int. Cl.[7] .................................................. B41J 2/04
(52) U.S. Cl. ........................................................ 347/54
(58) Field of Search ................................ 347/54, 87, 84, 347/49, 68, 69, 70, 71, 72, 50, 40, 20, 44, 47, 27; 399/261; 361/700; 29/890.1; 310/328–330

(56) References Cited

U.S. PATENT DOCUMENTS

| | | | |
|---|---|---|---|
| 1,941,001 A | * | 12/1933 | Hansell |
| 3,373,437 A | * | 3/1968 | Sweet et al. |
| 3,596,275 A | * | 7/1971 | Sweet |
| 3,683,212 A | * | 8/1972 | Zolten |
| 3,747,120 A | * | 7/1973 | Stemme |
| 3,946,398 A | * | 3/1976 | Kyser et al. |
| 4,459,601 A | * | 7/1984 | Howkins |
| 4,490,728 A | * | 12/1984 | Vaught et al. |
| 4,584,590 A | * | 4/1986 | Fischbeck et al. |
| 5,696,546 A | | 12/1997 | Narang et al. |
| 5,812,159 A | | 9/1998 | Anagnostopoulos et al. |
| 5,872,582 A | | 2/1999 | Pan |
| 5,912,684 A | * | 6/1999 | Fujii et al. |
| 5,971,355 A | | 10/1999 | Biegelsen et al. |
| 6,087,638 A | * | 7/2000 | Silverbrook |
| 6,171,875 B1 | * | 1/2001 | Silverbrook |
| 6,180,427 B1 | * | 1/2001 | Silverbrook |
| 6,217,183 B1 | * | 4/2001 | Silverbrook |
| 6,220,694 B1 | * | 4/2001 | Silverbrook |
| 6,238,040 B1 | * | 5/2001 | Silverbrook |
| 6,239,821 B1 | * | 5/2001 | Silverbrook |
| 6,243,113 B1 | * | 6/2001 | Silverbrook |
| 6,244,691 B1 | * | 6/2001 | Silverbrook |
| 6,245,247 B1 | * | 6/2001 | Silverbrook |
| 6,247,790 B1 | * | 6/2001 | Silverbrook |
| 6,247,791 B1 | * | 6/2001 | Silverbrook |
| 6,247,792 B1 | * | 6/2001 | Silverbrook |
| 6,247,795 B1 | * | 6/2001 | Silverbrook |
| 6,247,796 B1 | * | 6/2001 | Silverbrook |
| 6,477,794 | * | 6/2001 | Silverbrook |

FOREIGN PATENT DOCUMENTS

JP             404325257 A      11/1992

\* cited by examiner

*Primary Examiner*—Raquel Yvette Gordon

(57) ABSTRACT

An ink jet print head includes a nozzle chamber for storage of ink to be ejected from an ink ejection nozzle formed in one wall of the nozzle chamber; and a movable paddle actuator mechanism formed in a first wall of the nozzle chamber, one end of the paddle actuator traversing along a second wall of the nozzle chamber, the second wall being substantially perpendicular to the first wall; the one end further including a flange having a surface abutting the second wall, the movable paddle actuator mechanism being operable to cause the ejection of ink from the ink ejection nozzle with the flange moving substantially tangentially to the second wall.

20 Claims, 35 Drawing Sheets

INK JET NOZZLE ASSEMBLY INCLUDING A FLUIDIC SEAL

This is a C-I-P of application Ser. No. 09/112,820 filed on Jul. 10, 1998.

FIELD OF THE INVENTION

The present invention relates to the field of inkjet printing and, in particular, discloses a surface bend actuator vented ink supply ink jet printer.

BACKGROUND OF THE INVENTION

Many different types of printing have been invented, a large number of which are presently in use. The known forms of printers have a variety of methods for marking the print media with a relevant marking media. Commonly used forms of printing include offset printing, laser printing and copying devices, dot matrix type impact printers, thermal paper printers, film recorders, thermal wax printers, dye sublimation printers and ink jet printers both of the drop on demand and continuous flow type. Each type of printer has its own advantages and problems when considering cost, speed, quality, reliability, simplicity of construction and operation etc.

In recent years, the field of ink jet printing, wherein each individual pixel of ink is derived from one or more ink nozzles has become increasingly popular primarily due to its inexpensive and versatile nature.

Many different techniques of ink jet printing have been invented. For a survey of the field, reference is made to an article by J Moore, "Non-Impact Printing: Introduction and Historical Perspective", Output Hard Copy Devices, Editors R Dubeck and S Sherr, pages 207–220 (1988).

Ink Jet printers themselves come in many different types. The utilization of a continuous stream of ink in ink jet printing appears to date back to at least 1929 wherein U.S. Pat. No. 1,941,001 by Hansell discloses a simple form of continuous stream electro-static inkjet printing.

U.S. Pat. 3,596,275 by Sweet also discloses a process of a continuous ink jet printing including the step wherein the ink jet stream is modulated by a high frequency electro-static field so as to cause drop separation. This technique is still utilized by several manufacturers including Elmjet and Scitex (see also U.S. Pat. No. 3,373,437 by Sweet et al).

Piezoelectric ink jet printers are also one form of commonly utilized ink jet printing device. Piezoelectric systems are disclosed by Kyser et. al. in U.S. Pat. No. 3,946,398 (1970) which utilizes a diaphragm mode of operation, by Zolten in U.S. Pat. No. 3,683,212 (1970) which discloses a squeeze mode of operation of a piezoelectric crystal, Stemme in U.S. Pat. No. 3,747,120 (1972) discloses a bend mode of piezoelectric operation, Howkins in U.S. Pat. No. 4,459,601 discloses a piezoelectric push mode actuation of the ink jet stream and Fischbeck in U.S. Pat. No. 4,584,590 which discloses a shear mode type of piezoelectric transducer element.

Recently, thermal ink jet printing has become an extremely popular form of ink jet printing. The ink jet printing techniques include those disclosed by Endo et al in GB 2007162 (1979) and Vaught et al in U.S. Pat. No. 4,490,728. Both the aforementioned references disclosed ink jet printing techniques which rely upon the activation of an electrothermal actuator which results in the creation of a bubble in a constricted space, such as a nozzle, which thereby causes the ejection of ink from an aperture connected to the confined space onto a relevant print media. Printing devices utilizing the electro-thermal actuator are manufactured by manufacturers such as Canon and Hewlett Packard.

As can be seen from the foregoing, many different types of printing technologies are available. Ideally, a printing technology should have a number of desirable attributes. These include inexpensive construction and operation, high speed operation, safe and continuous long term operation etc. Each technology may have its own advantages and disadvantages in the areas of cost, speed, quality, reliability, power usage, simplicity of construction operation, durability and consumables.

SUMMARY OF THE INVENTION

There is disclosed herein an ink jet nozzle assembly including a nozzle chamber containing ink to be ejected and a fluidic seal comprising a meniscus formed by said ink across two solid surfaces of said assembly that move relative to one another when the assembly is activated in use.

There is further disclosed herein an ink jet nozzle assembly including:

a nozzle chamber having an inlet in fluid communication with an ink reservoir and a nozzle through which ink from said chamber can be ejected;

the chamber including a fixed portion and a movable portion configured for relative movement in an ejection phase and alternate relative movement in a refill phase;

the movable portion being formed in a first wall of said nozzle chamber and having one end traversing adjacent a second wall of said nozzle chamber, said second wall being substantially perpendicular to said first wall; and the inlet being positioned and dimensioned relative to the nozzle such that ink is ejected preferentially from the chamber through the nozzle in droplet form during the ejection phase, and ink is alternately drawn preferentially into the chamber from the reservoir through the inlet during the refill phase.

Preferably the movable portion includes the nozzle and the fixed portion is mounted on a substrate.

Preferably the fixed portion includes the nozzle mounted on a substrate and a movable portion includes an ejection paddle.

Preferably one end of said first wall further includes a flange including a surface adjacent said second wall.

Preferably said flange is spaced from said second wall by a slot.

Preferably said second wall of said chamber forms one wall of said inlet.

Preferably said movable portion includes a thermal bend actuator.

Preferably the assembly is formed on a silicon wafer.

Preferably said inlet is formed by back etching a back surface of said silicon wafer.

Preferably said back etching comprises a plasma etching of said back surface.

Preferably said movable portion, in being actuated to be eject a drop of ink, restricts a flow of ink into said chamber via said inlet.

Preferably the assembly further includes a slot around a substantial portion of said movable portion, said slot interconnecting said nozzle chamber with an external ambient atmosphere, said slot being dimensioned to provide for fluid movement during operation of said movable portion while not allowing for the ejection of fluid therethrough.

Preferably said thermal bend actuator comprises a conductive heater layer between layers of a substantially non-conductive material having a higher coefficient of thermal expansion.

Preferably said conductive heater layer is arranged in a serpentine form so that, upon conductive heating of said conductive heater layer, said conductive heater layer forms a concertina so as to allow for substantially unhindered expansion of said substantially non-conductive material.

Preferably said substantially non-conductive material comprises substantially polytetrafluoroethylene.

Preferably said silicon wafer is initially processed utilizing a CMOS processing system so as to form a electrical circuit required to operate said ink jet nozzle assembly on said silicon wafer.

BRIEF DESCRIPTION OF THE DRAWINGS

Notwithstanding any other forms which may fall within the scope of the present invention, preferred forms of the invention will now be described, by way of example only, with reference to the accompanying drawings in which.

DESCRIPTION OF PREFERRED AND OTHER EMBODIMENTS

The preferred embodiment of the present invention discloses an inkjet printing device made up of a series of nozzle arrangements. Each nozzle arrangement includes a thermal surface actuator device which includes an L-shaped cross sectional profile and an air breathing edge such that actuation of the paddle actuator results in a drop being ejected from a nozzle utilizing a very low energy level.

Figure 1:
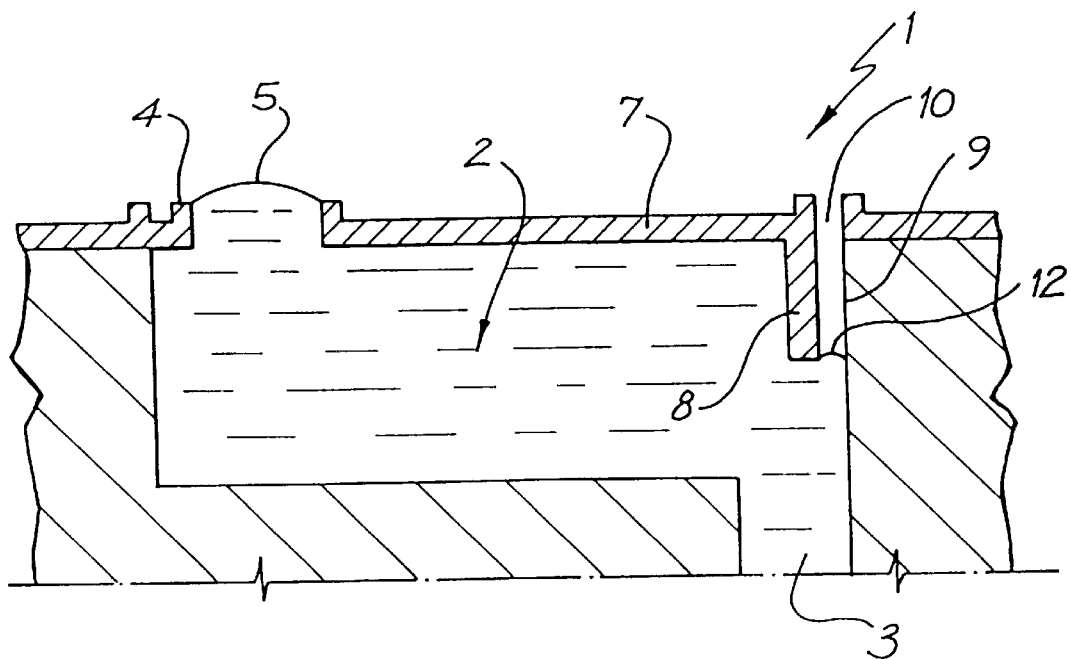
FIG. 1 to FIG. 3 are schematic sectional views illustrating the operational principles of the preferred embodiment.
Figure 2:
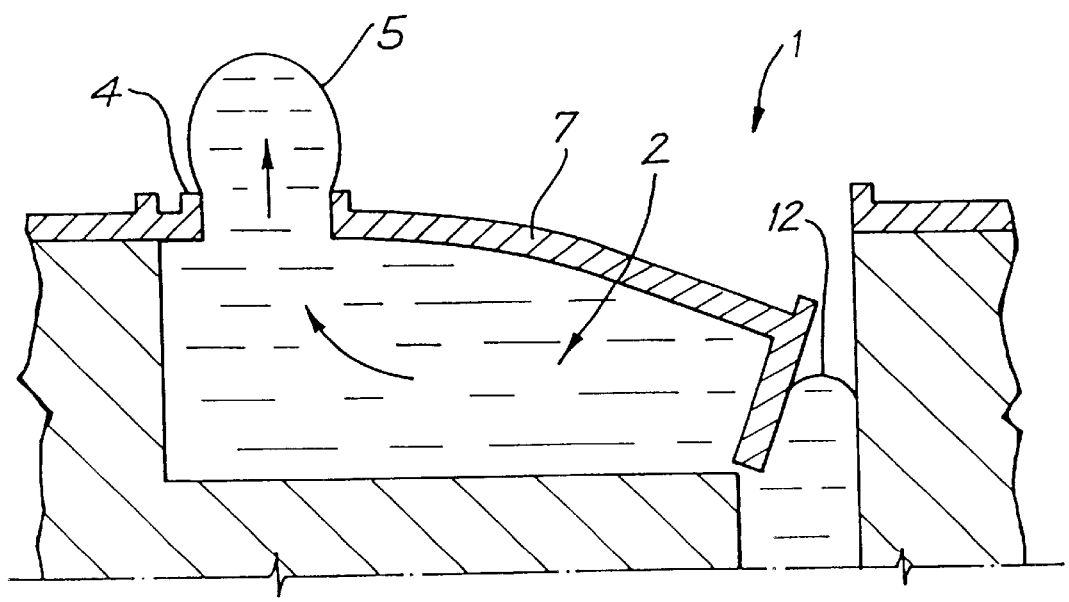
Figure 3:
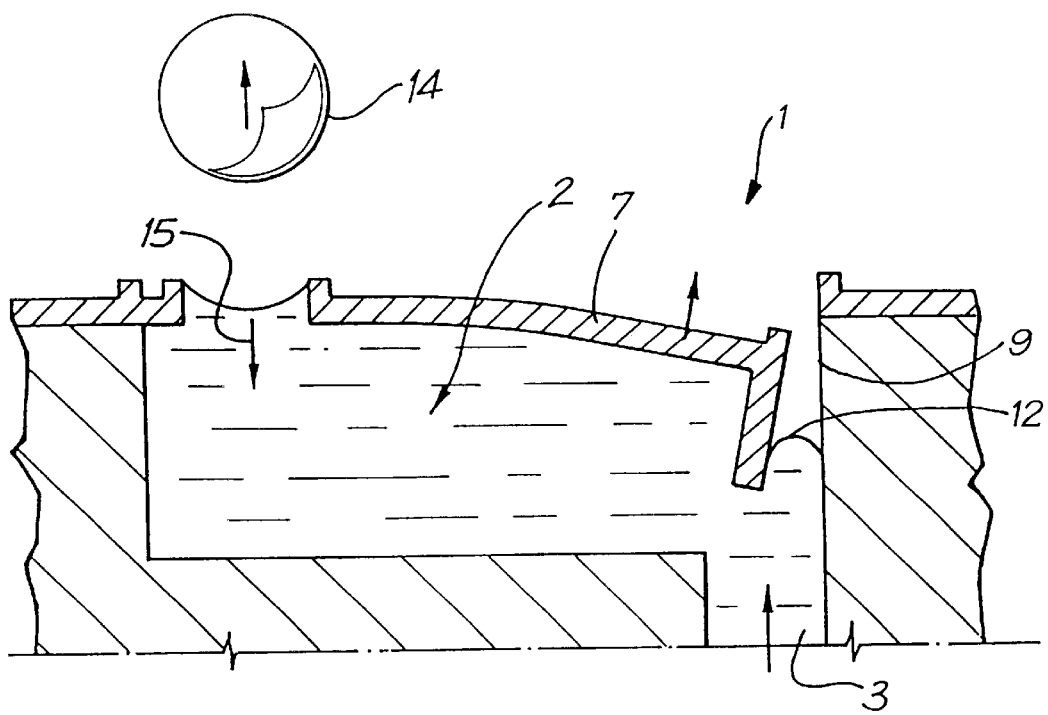

Turning initially to FIG. 1 to FIG. 3, there will now be described the operational principles of the preferred embodiment. In FIG. 1, there is illustrated schematically a sectional view of a single nozzle arrangement 1 which includes an ink nozzle chamber 2 containing an ink supply which is resupplied by means of an ink supply channel 3. A nozzle rim 4 is provided, across which a meniscus 5 forms, with a slight bulge when in the quiescent state. A bend actuator device 7 is formed on the top surface of the nozzle chamber and includes a side arm 8 which runs generally parallel to the surface 9 of the nozzle chamber wall so as to form an "air breathing slot" 10 which assists in the low energy actuation of the bend actuator 7. Ideally, the front surface of the bend actuator 7 is hydrophobic such that a meniscus 12 forms between the bend actuator 7 and the surface 9 leaving an air pocket in slot 10.

When it is desired to eject a drop via the nozzle rim 4, the bend actuator 7 is actuated so as to rapidly bend down as illustrated in FIG. 2. The rapid downward movement of the actuator 7 results in a general increase in pressure of the ink within the nozzle chamber 2. This results in a outflow of ink around the nozzle rim 4 and a general bulging of the meniscus 5. The meniscus 12 undergoes a low amount of movement.

The actuator device 7 is then turned off so as to slowly return to its original position as illustrated in FIG. 3. The return of the actuator 7 to its original position results in a reduction in the pressure within the nozzle chamber 2 which results in a general back flow of ink into the nozzle chamber 2. The forward momentum of the ink outside the nozzle chamber in addition to the back flow of ink 15 results in a general necking and breaking off of the drop 14. Surface tension effects then draw further ink into the nozzle chamber via ink supply channel 3. Ink is drawn in the nozzle chamber 3 until the quiescent position of FIG. 1 is again achieved.

Figure 4A:
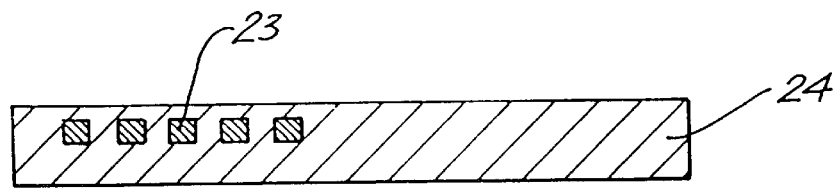
FIG. 4a and FIG. 4b illustrate the operational principles of the thermal actuator of the preferred embodiment.
Figure 4B:
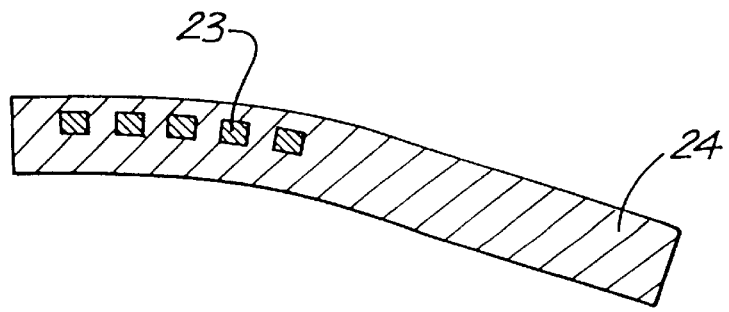

The actuator device 7 can be a thermal actuator which is heated by means of passing a current through a conductive core. Preferably, the thermal actuator is provided with a conductive core encased in a material such as polytetrafluoroethylene which has a high level coefficient of expansion. As illustrated in FIG. 4, a conductive core 23 is preferably of a serpentine form and encased within a material 24 having a high coefficient of thermal expansion. Hence, as illustrated in FIG. 4b, on heating of the conductive core 23, the material 24 expands to a greater extent and is therefore caused to bend down in accordance with requirements.

Figure 5:
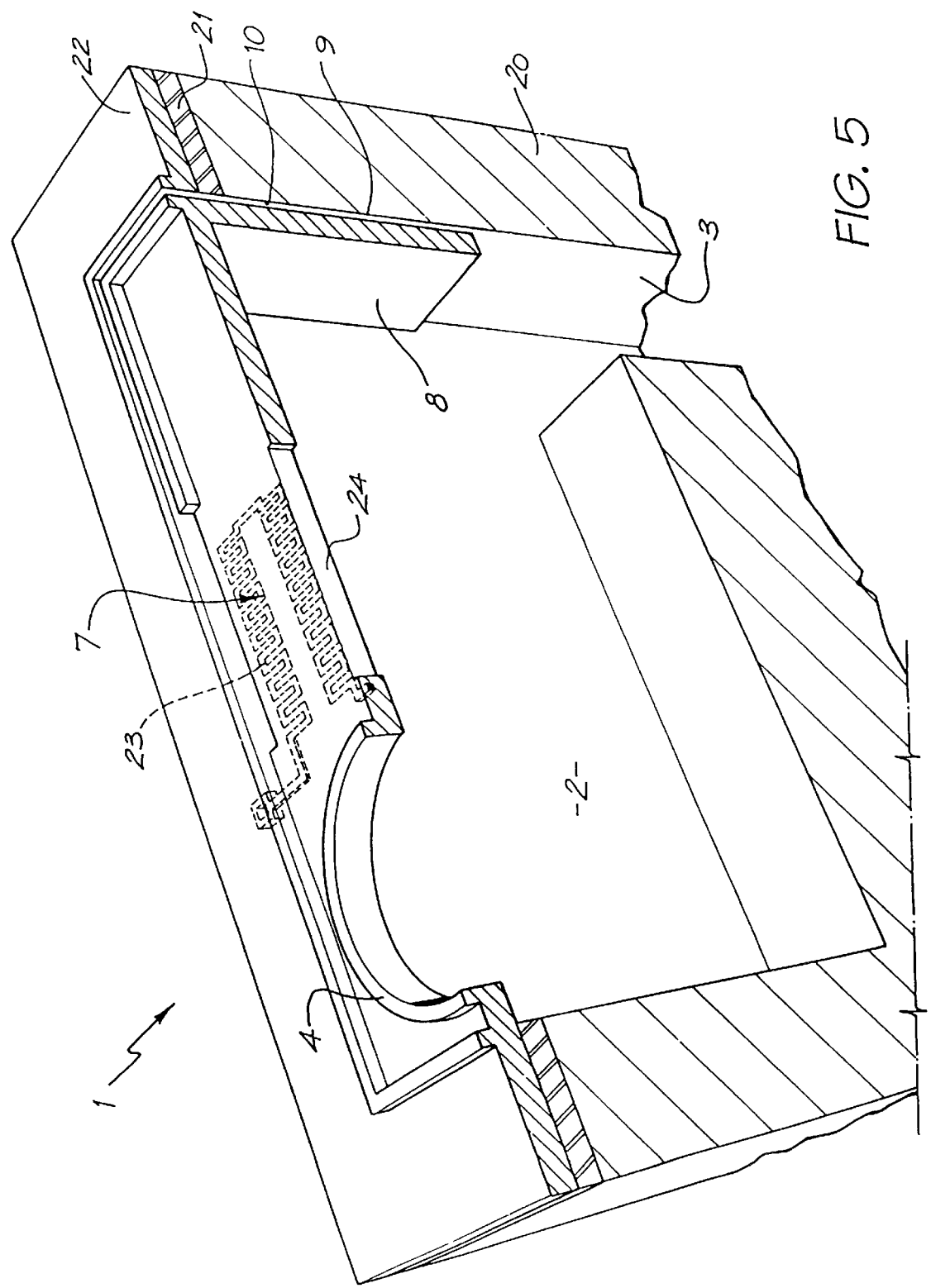
FIG. 5 is a side perspective view of a single nozzle arrangement of the preferred embodiment.

Turning now to FIG. 5, there is illustrated a side perspective view, partly in section, of a single nozzle arrangement when in the state as described with reference to FIG. 2. The nozzle arrangement 1 can be formed in practice on a semiconductor wafer 20 utilizing standard MEMS techniques.

The silicon wafer 20 preferably is processed so as to include a CMOS layer 21 which can include the relevant electrical circuitry required for the full control of a series of nozzle arrangements 1 formed so as to form a printhead unit. On top of the CMOS layer 21 is formed a glass layer 22 and an actuator 7 which is driven by means of passing a current through a serpentine copper coil 23 which is encased in the upper portions of a polytetrafluoroethylene (PTFE) layer 24. Upon passing a current through the coil 23, the coil 23 is heated as is the PTFE layer 24. PTFE has a very high coefficient of thermal expansion and hence expands rapidly.

The coil 23 constructed in a serpentine nature is able to expand substantially with the expansion of the PTFE layer 24. The PTFE layer 24 includes a lip portion 8 which upon expansion, bends in a scooping motion as previously described. As a result of the scooping motion, the meniscus 5 generally bulges and results in a consequential ejection of a drop of ink. The nozzle chamber 4 is later replenished by means of surface tension effects in drawing ink through an ink supply channel 3 which is etched through the wafer through the utilization of a highly an isotropic silicon trench etcher. Hence, ink can be supplied to the back surface of the wafer and ejected by means of actuation of the actuator 7. The gap between the side arm 8 and chamber wall 9 allows for a substantial breathing effect which results in a low level of energy being required for drop ejection.

Figure 6:
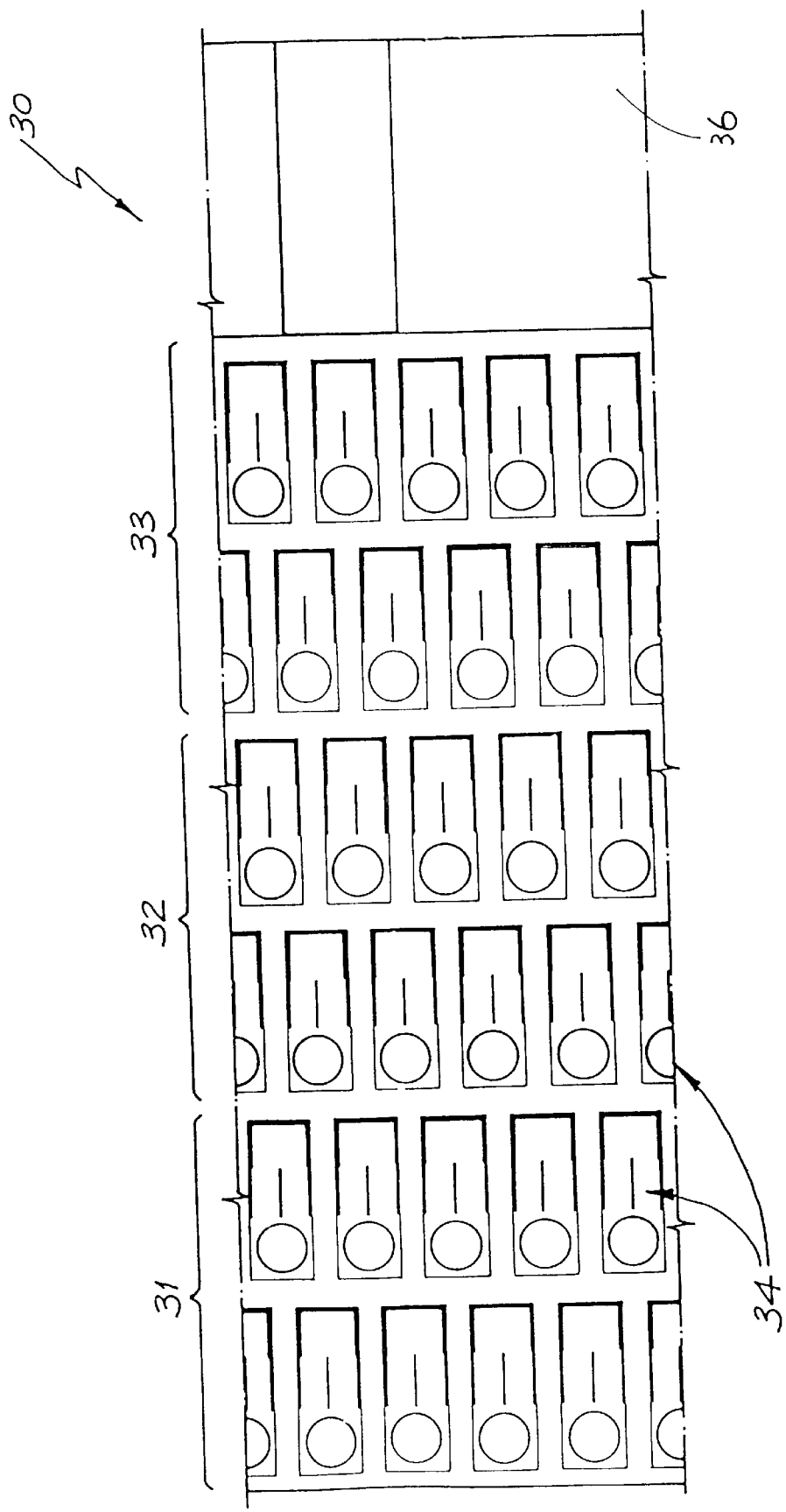
FIG. 6 illustrates an array view of a portion of a printhead constructed in accordance with the principles of the preferred embodiment.

A large number of arrangements 1 of FIG. 5 can be formed together on a wafer with the arrangements being collected into printheads which can be of various sizes in accordance with requirements. Turning now to FIG. 6, there is illustrated one form of an array 30 which is designed so as to provide three color printing with each color providing two spaced apart rows of nozzle arrangements 34. The three groupings can comprise groupings 31, 32 and 33 with each grouping supplied with a separate ink color so as to provide for full color printing capability. Additionally, a series of bond pads e.g. 36 are provided for TAB bonding control signals to the printhead 30. Obviously, the arrangement 30 of FIG. 6 illustrates only a portion of a printhead which can be of a length as determined by requirements.

Figure 7:
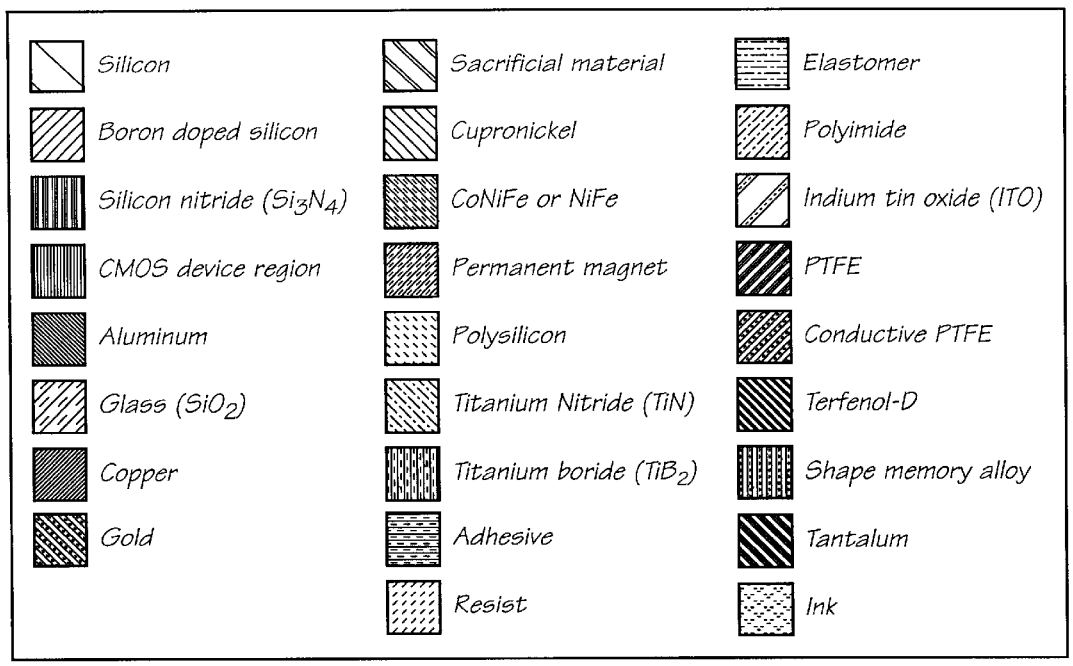
FIG. 7 provides a legend of the materials indicated in FIGS. 8 to 16.
Figure 8:
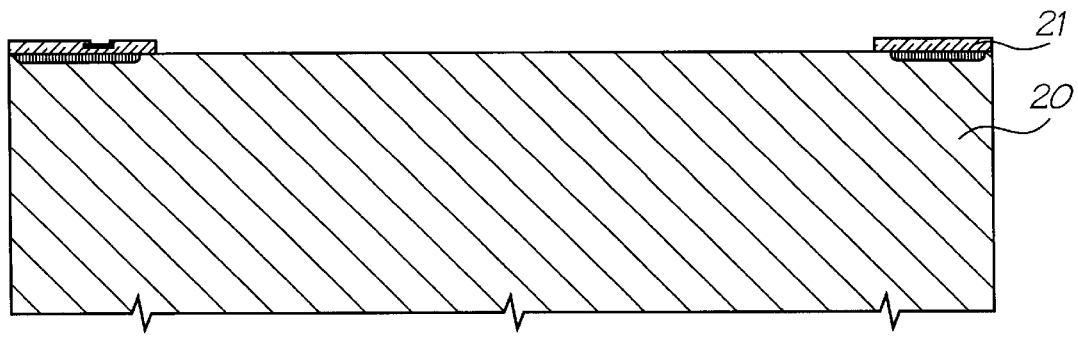
FIG. 8 to FIG. 17 illustrate sectional views of the manufacturing steps in one form of construction of an ink jet printhead nozzle.
Figure 9:
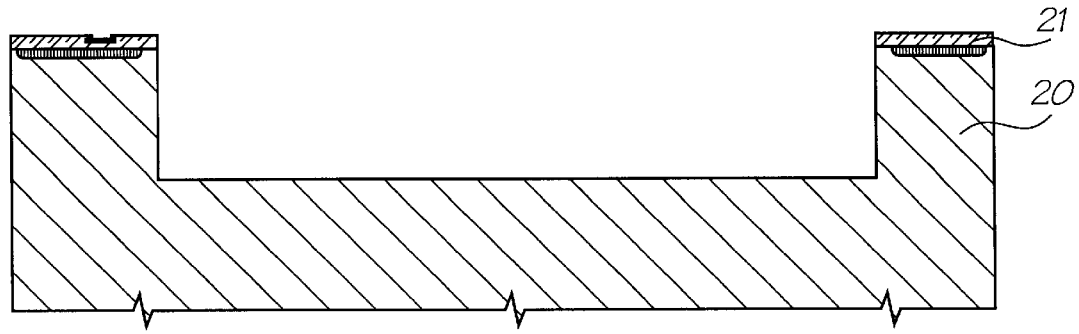
Figure 10:
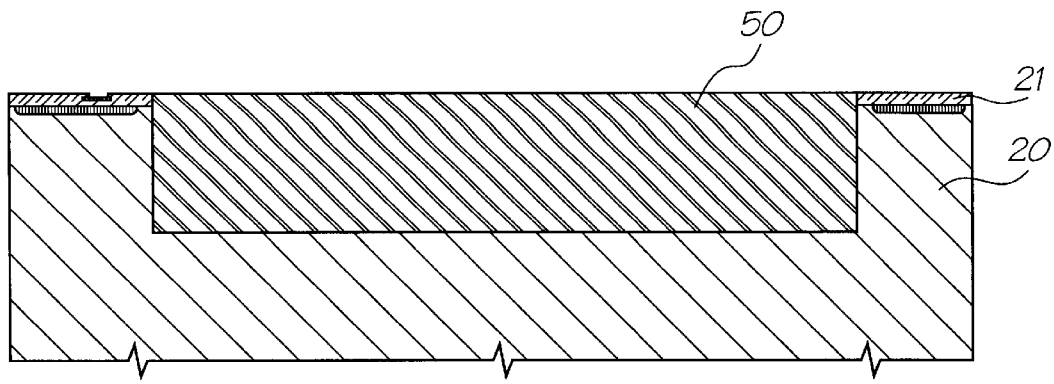
Figure 11:
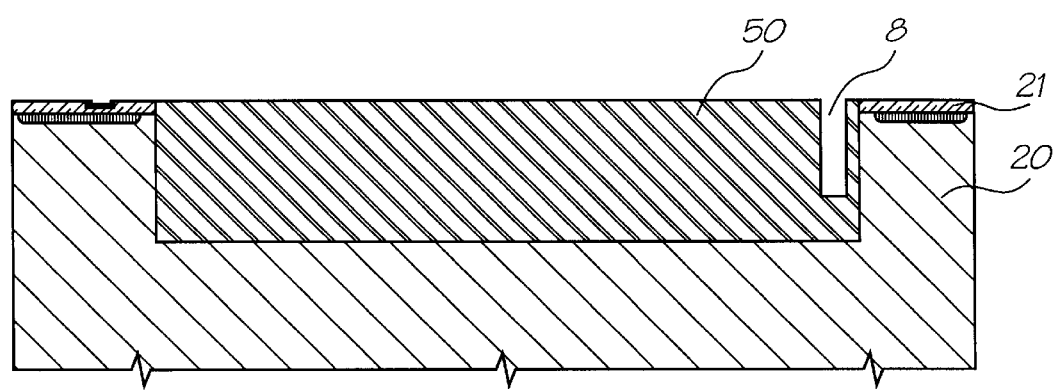
Figure 12:
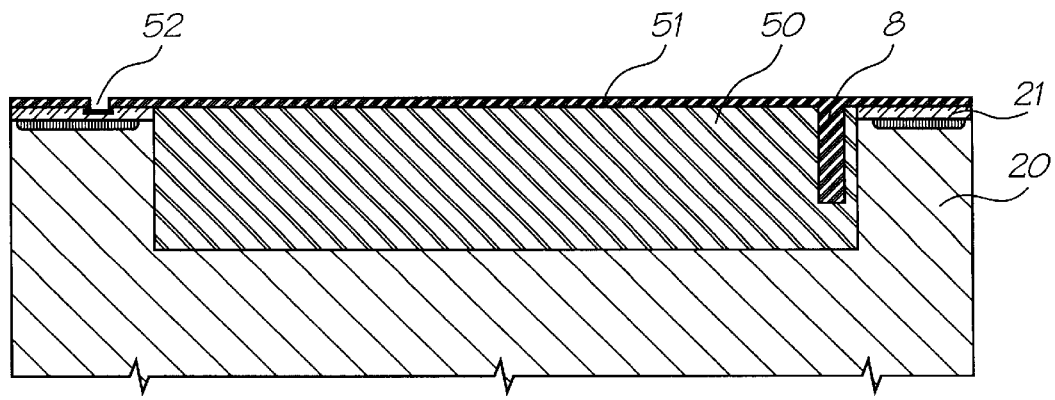
Figure 13:
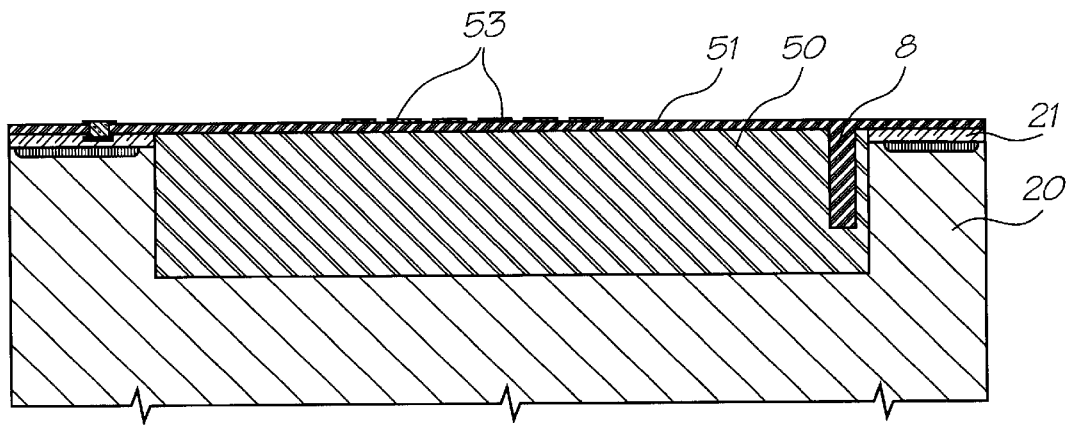
Figure 14:
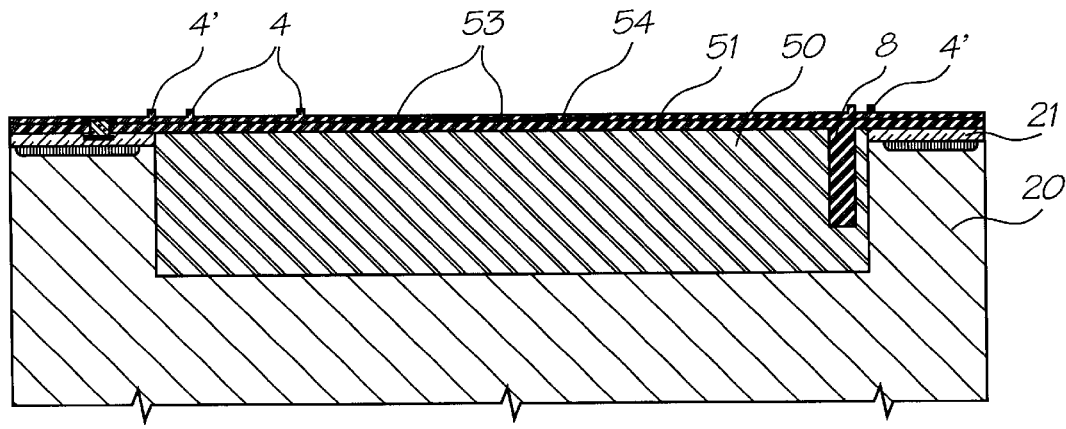
Figure 15:
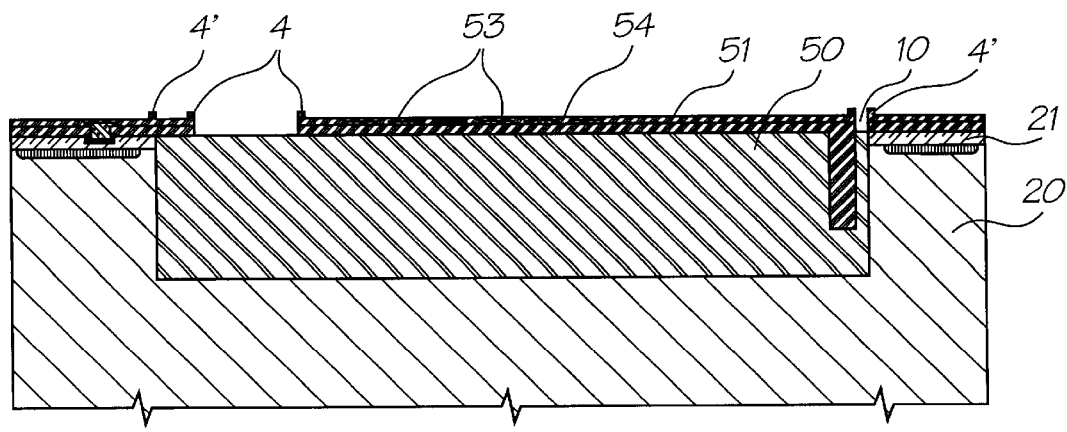
Figure 16:
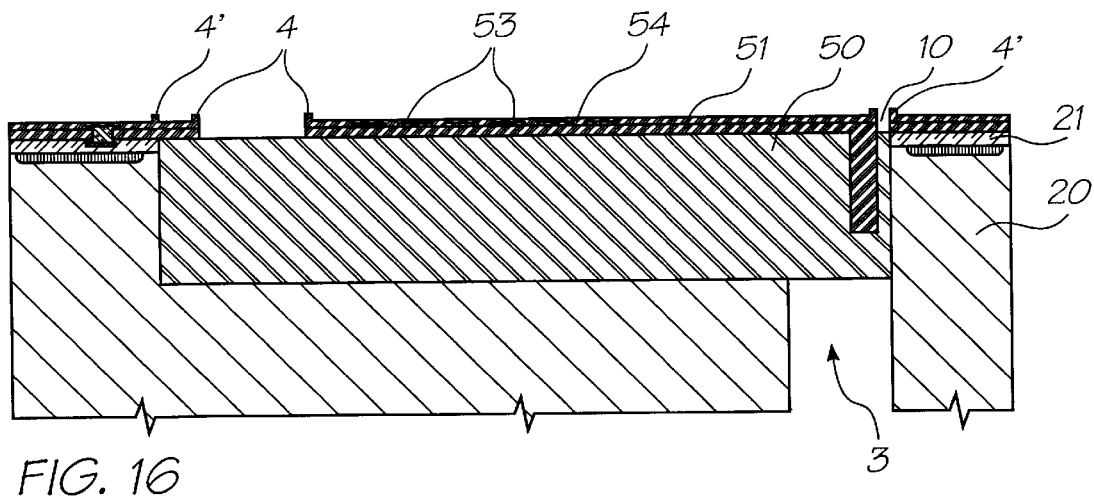
Figure 17:
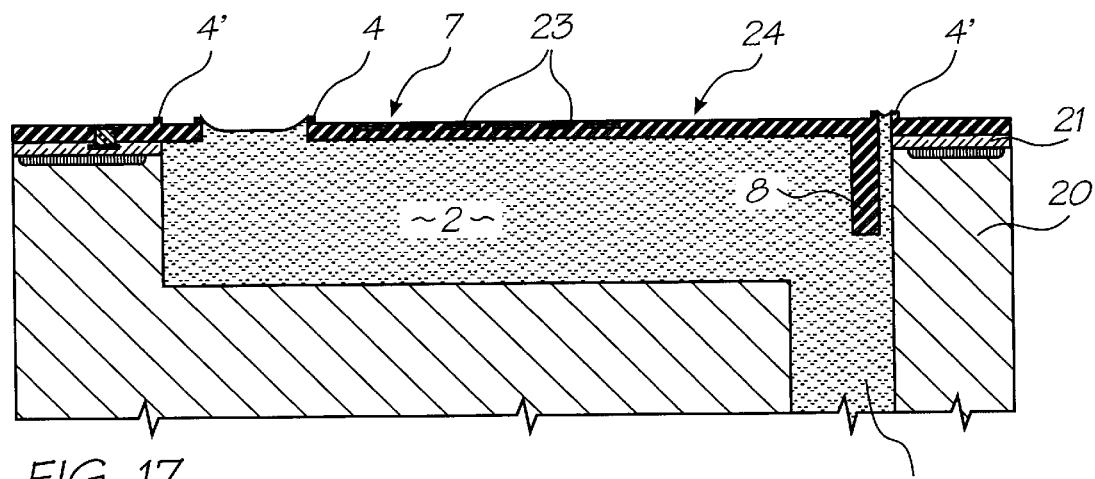

One form of detailed manufacturing process which can be used to fabricate monolithic ink jet printheads operating in accordance with the principles taught by the present embodiment can proceed utilizing the following steps:

1. Using a double sided polished wafer 20, complete drive transistors, data distribution, and timing circuits using a 0.5 micron, one poly, 2 metal CMOS process 21. Relevant features of the wafer at this step are shown in FIG. 8. For clarity, these diagrams may not be to scale, and may not represent a cross section though any single plane of the nozzle. FIG. 7 is a key to representations of various materials in these manufacturing diagrams, and those of other cross referenced ink jet configurations.
2. Etch the CMOS oxide layers down to silicon or second level metal using Mask 1. This mask defines the nozzle cavity and the edge of the chips. Relevant features of the wafer at this step are shown in FIG. 8.
3. Plasma etch the silicon to a depth of 20 microns using the oxide as a mask. This step is shown in FIG. 9.
4. Deposit 23 microns of sacrificial material 50 and planarize down to oxide using CMP. This step is shown in FIG. 10.
5. Etch the sacrificial material to a depth of 15 microns using Mask 2. This mask defines the vertical paddle 8 at the end of the actuator. This step is shown in FIG. 11.
6. Deposit a thin layer (not shown) of a hydrophilic polymer, and treat the surface of this polymer for PTFE adherence.
7. Deposit 1.5 microns of polytetrafluoroethylene (PTFE) 51.
8. Etch the PTFE and CMOS oxide layers to second level metal using Mask 3. This mask defines the contact vias 52 for the heater electrodes. This step is shown in FIG. 12.
9. Deposit and pattern 0.5 microns of gold 53 using a lift-off process using Mask 4. This mask defines the heater pattern. This step is shown in FIG. 13.
10. Deposit 1.5 microns of PTFE 54.
11. Etch 1 micron of PTFE using Mask 5. This mask defines the nozzle rim 4 and the rim 4 at the edge of the nozzle chamber. This step is shown in FIG. 14.
12. Etch both layers of PTFE and the thin hydrophilic layer down to the sacrificial layer using Mask 6. This mask defines the gap 10 at the edges of the actuator and paddle. This step is shown in FIG. 15.
13. Back-etch through the silicon wafer to the sacrificial layer (with, for example, an ASE Advanced Silicon Etcher from Surface Technology Systems) using Mask 7. This mask defines the ink inlets which 3 are etched through the wafer. This step is shown in FIG. 16.
14. Etch the sacrificial layers. The wafer is also diced by this etch.
15. Mount the printheads in their packaging, which may be a molded plastic former incorporating ink channels which supply the appropriate color ink to the ink inlets at the back of the wafer.
16. Connect the printheads to their interconnect systems. For a low profile connection with minimum disruption of airflow, TAB may be used. Wire bonding may also be used if the printer is to be operated with sufficient clearance to the paper.
17. Fill the completed printheads with ink 55 and test them. A filled nozzle is shown in FIG. 17.

Figure 18:
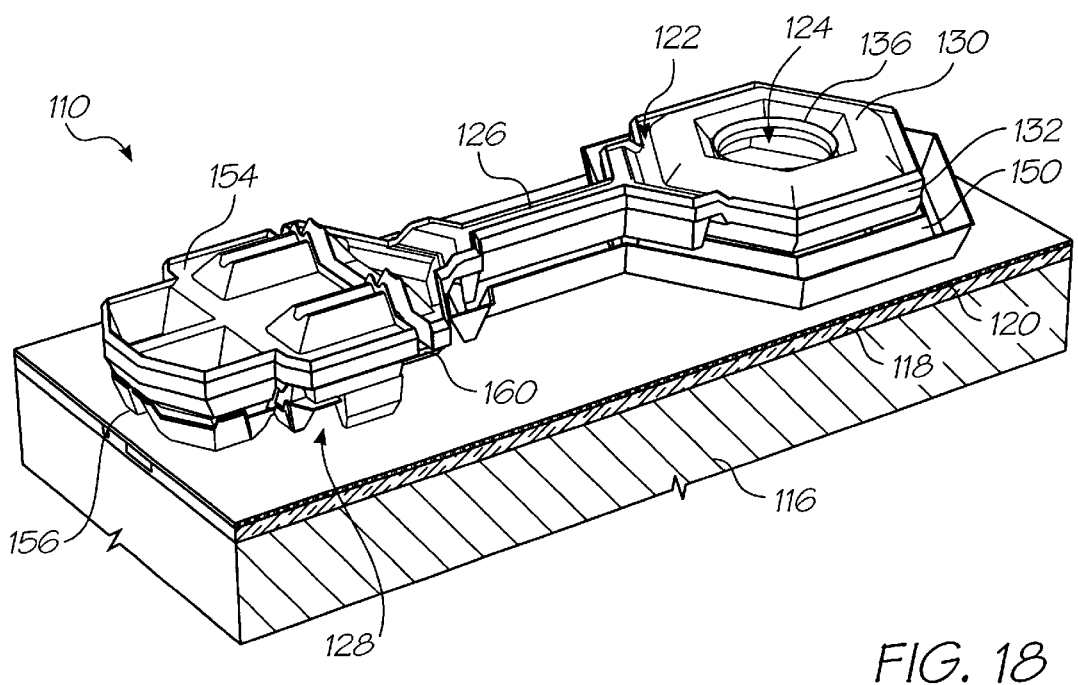
FIG. 18 shows a three dimensional, schematic view of a nozzle assembly for an ink jet printhead in accordance with another embodiment of the invention.

Referring now to FIG. 18 of the drawings, a nozzle assembly, in accordance with a further embodiment of the invention is designated generally by the reference numeral 110. An ink jet printhead has a plurality of nozzle assemblies 110 arranged in an array 114 (FIGS. 22 and 23) on a silicon substrate 116. The array 114 will be described in greater detail below.

The assembly 110 includes a silicon substrate or wafer 116 on which a dielectric layer 118 is deposited. A CMOS passivation layer 120 is deposited on the dielectric layer 118.

Each nozzle assembly 110 includes a nozzle 122 defining a nozzle opening 124, a connecting member in the form of a lever arm 126 and an actuator 128. The lever arm 126 connects the actuator 128 to the nozzle 122.

Figure 19:
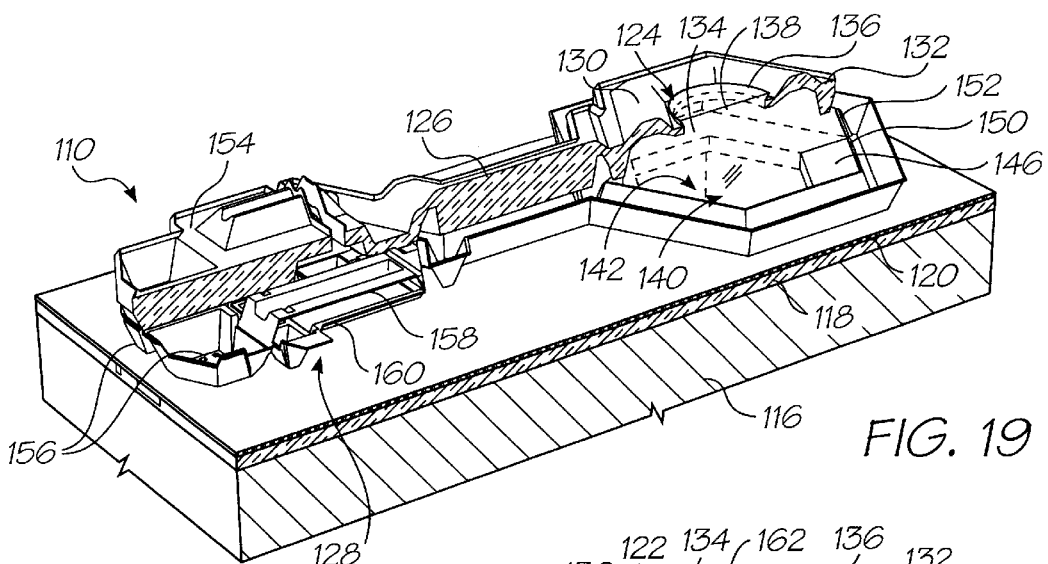
FIGS. 19 to 21 show a three dimensional, schematic illustration of an operation of the nozzle assembly of FIG. 18.
Figure 20:
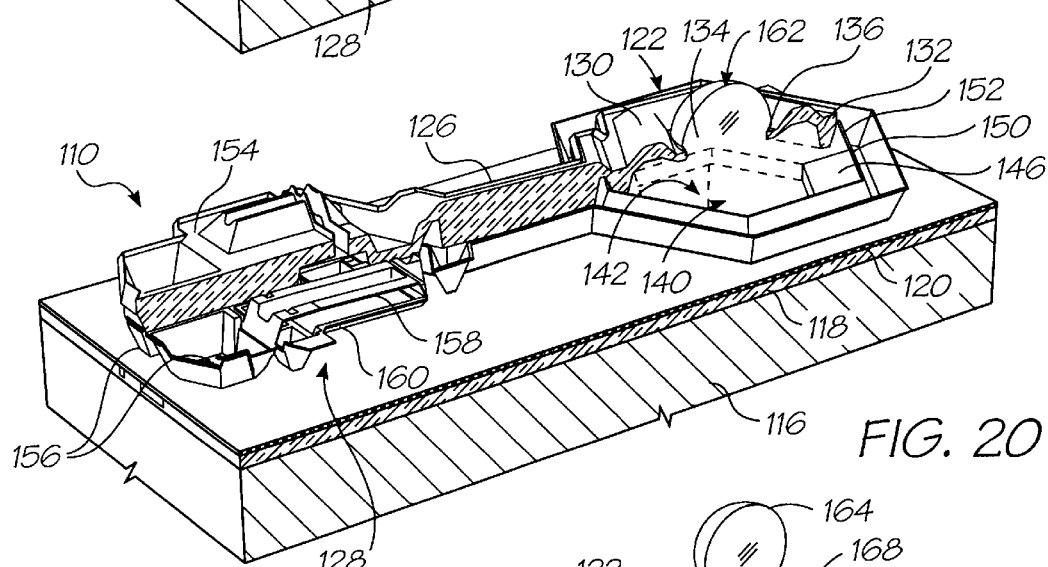
Figure 21:
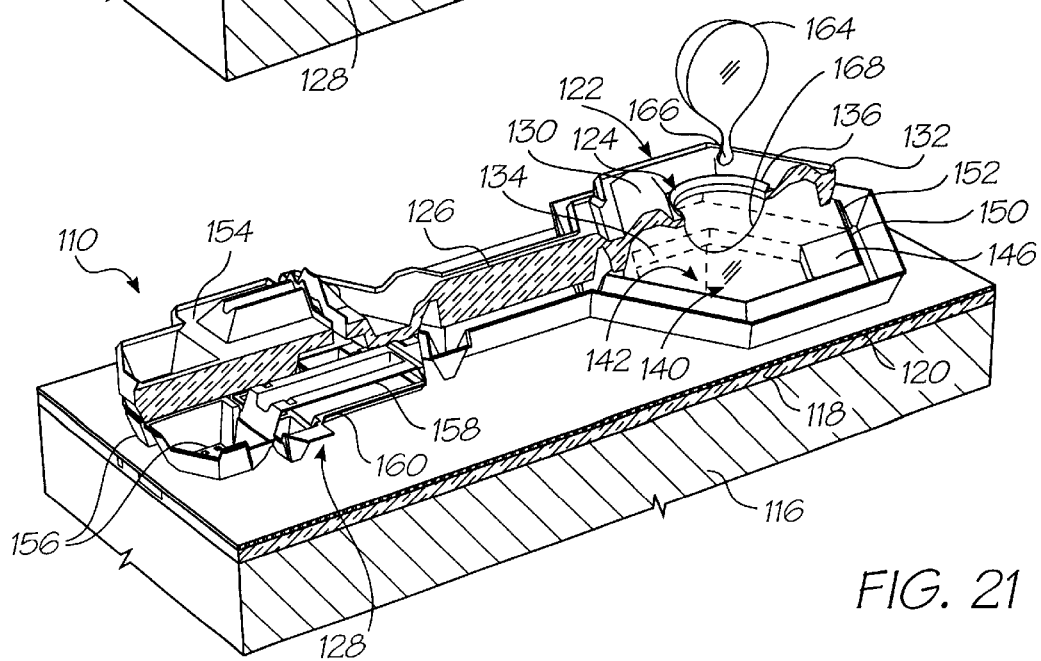

As shown in greater detail in FIGS. 19 to 21 of the drawings, the nozzle 122 comprises a crown portion 130 with a skirt portion 132 depending from the crown portion 130. The skirt portion 132 forms part of a peripheral wall of a nozzle chamber 134 (FIGS. 19 to 21 of the drawings). The nozzle opening 124 is in fluid communication with the nozzle chamber 134. It is to be noted that the nozzle opening 124 is surrounded by a raised rim 136 which "pins" a meniscus 138 (FIG. 19) of a body of ink 140 in the nozzle chamber 134.

An ink inlet aperture 142 (shown most clearly in FIG. 23) is defined in a floor 146 of the nozzle chamber 134. The aperture 142 is in fluid communication with an ink inlet channel 148 defined through the substrate 116.

A wall portion 150 bounds the aperture 142 and extends upwardly from the floor portion 146. The skirt portion 132, as indicated above, of the nozzle 122 defines a first part of a peripheral wall of the nozzle chamber 134 and the wall portion 150 defines a second part of the peripheral wall of the nozzle chamber 134.

The wall 150 has an inwardly directed lip 152 at its free end which serves as a fluidic seal which inhibits the escape of ink when the nozzle 122 is displaced, as will be described in greater detail below. It will be appreciated that, due to the viscosity of the ink 140 and the small dimensions of the spacing between the lip 152 and the skirt portion 132, the inwardly directed lip 152 and surface tension function as a seal for inhibiting the escape of ink from the nozzle chamber 134.

The actuator 128 is a thermal bend actuator and is connected to an anchor 154 extending upwardly from the substrate 116 or, more particularly, from the CMOS passivation layer 120. The anchor 154 is mounted on conductive pads 156 which form an electrical connection with the actuator 128.

The actuator 128 comprises a first, active beam 158 arranged above a second, passive beam 160. In a preferred embodiment, both beams 158 and 160 are of, or include, a conductive ceramic material such as titanium nitride (TiN).

Both beams 158 and 160 have their first ends anchored to the anchor 154 and their opposed ends connected to the arm 126. When a current is caused to flow through the active beam 158 thermal expansion of the beam 158 results. As the passive beam 160, through which there is no current flow, does not expand at the same rate, a bending moment is created causing the arm 126 and, hence, the nozzle 122 to be displaced downwardly towards the substrate 116 as shown in FIG. 20 of the drawings. This causes an ejection of ink through the nozzle opening 124 as shown at 162 in FIG. 20 of the drawings. When the source of heat is removed from the active beam 158, i.e. by stopping current flow, the nozzle 122 returns to its quiescent position as shown in FIG. 21 of the drawings. When the nozzle 122 returns to its quiescent position, an ink droplet 164 is formed as a result of the breaking of an ink droplet neck as illustrated at 166 in FIG. 21 of the drawings. The ink droplet 164 then travels on to the print media such as a sheet of paper. As a result of the formation of the ink droplet 164, a "negative" meniscus is formed as shown at 168 in FIG. 21 of the drawings. This "negative" meniscus 168 results in an inflow of ink 140 into the nozzle chamber 134 such that a new meniscus 138 (FIG. 19) is formed in readiness for the next ink drop ejection from the nozzle assembly 110.

Figure 22:
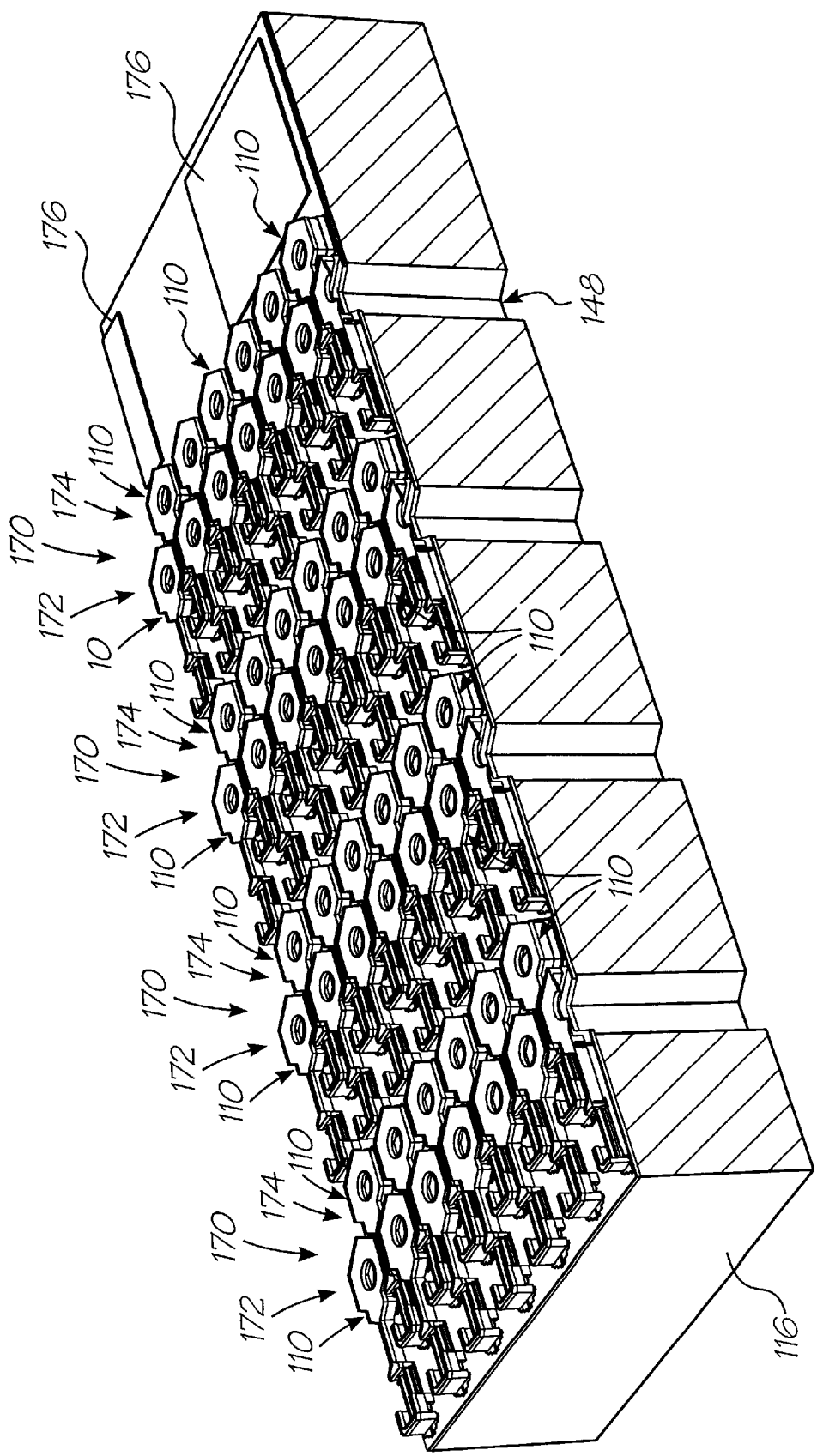
FIG. 22 shows a three dimensional view of a nozzle array constituting an ink jet printhead.
Figure 23:
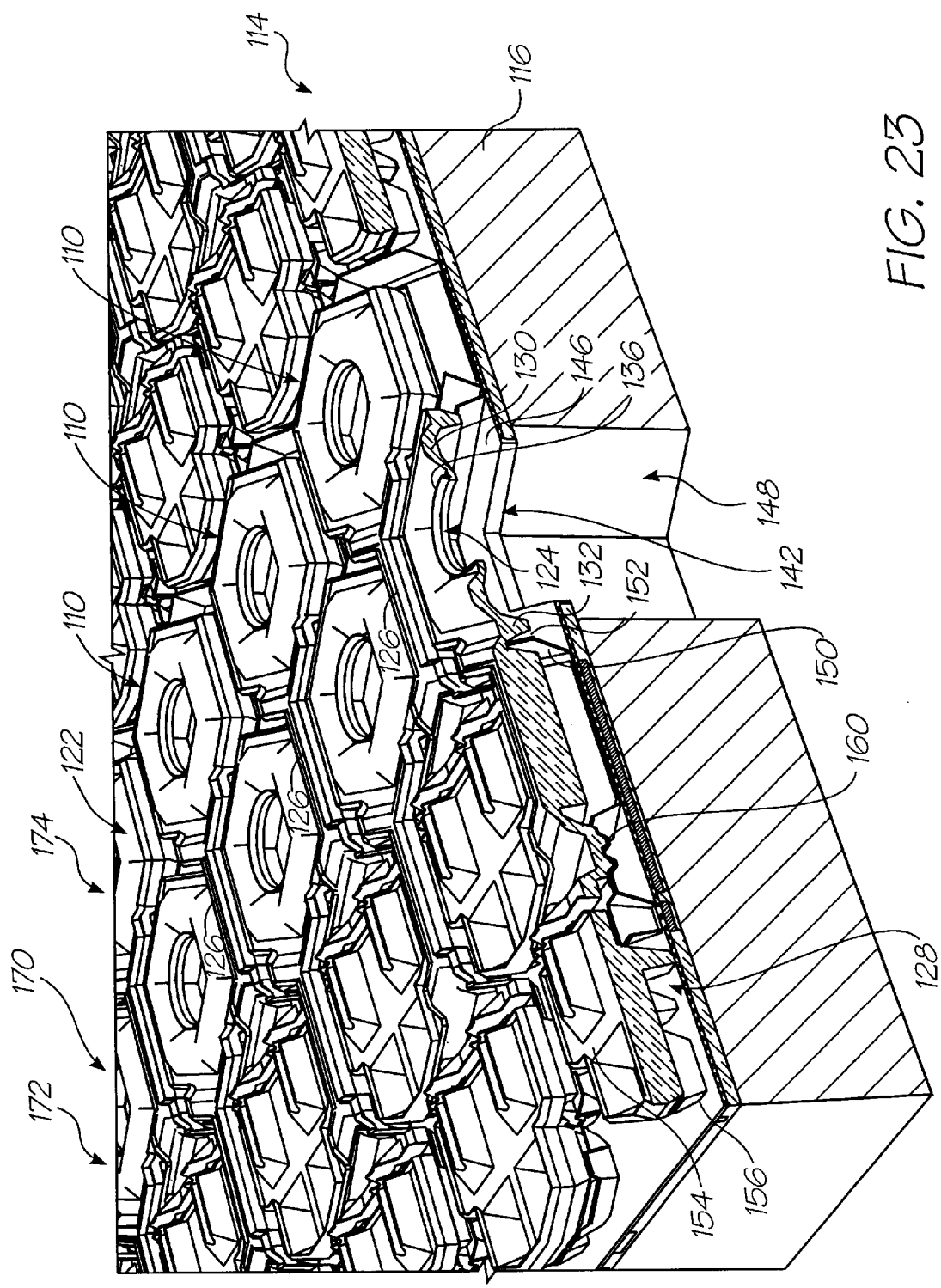
FIG. 23 shows, on an enlarged scale, part of the array of FIG. 22.

Referring now to FIGS. 22 and 23 of the drawings, the nozzle array 114 is described in greater detail. The array 114 is for a four color printhead. Accordingly, the array 114 includes four groups 170 of nozzle assemblies, one for each color. Each group 170 has its nozzle assemblies 110 arranged in two rows 172 and 174. One of the groups 170 is shown in greater detail in FIG. 23 of the drawings.

To facilitate close packing of the nozzle assemblies 110 in the rows 172 and 174, the nozzle assemblies 110 in the row 174 are offset or staggered with respect to the nozzle assemblies 110 in the row 172. Also, the nozzle assemblies 110 in the row 172 are spaced apart sufficiently far from each other to enable the lever arms 126 of the nozzle assemblies 110 in the row 174 to pass between adjacent nozzles 122 of the assemblies 110 in the row 172. It is to be noted that each nozzle assembly 110 is substantially dumbbell shaped so that the nozzles 122 in the row 172 nest between the nozzles 122 and the actuators 128 of adjacent nozzle assemblies 110 in the row 174.

Further, to facilitate close packing of the nozzles 122 in the rows 172 and 174, each nozzle 122 is substantially hexagonally shaped.

It will be appreciated by those skilled in the art that, when the nozzles 122 are displaced towards the substrate 116, in use, due to the nozzle opening 124 being at a slight angle with respect to the nozzle chamber 134 ink is ejected slightly off the perpendicular. It is an advantage of the arrangement shown in FIGS. 22 and 23 of the drawings that the actuators 128 of the nozzle assemblies 110 in the rows 172 and 174 extend in the same direction to one side of the rows 172 and 174. Hence, the ink droplets ejected from the nozzles 122 in the row 172 and the ink droplets ejected from the nozzles 122 in the row 174 are parallel to one another resulting in an improved print quality.

Also, as shown in FIG. 22 of the drawings, the substrate 116 has bond pads 176 arranged thereon which provide the electrical connections, via the pads 156, to the actuators 128 of the nozzle assemblies 110. These electrical connections are formed via the CMOS layer (not shown).

Figure 24:
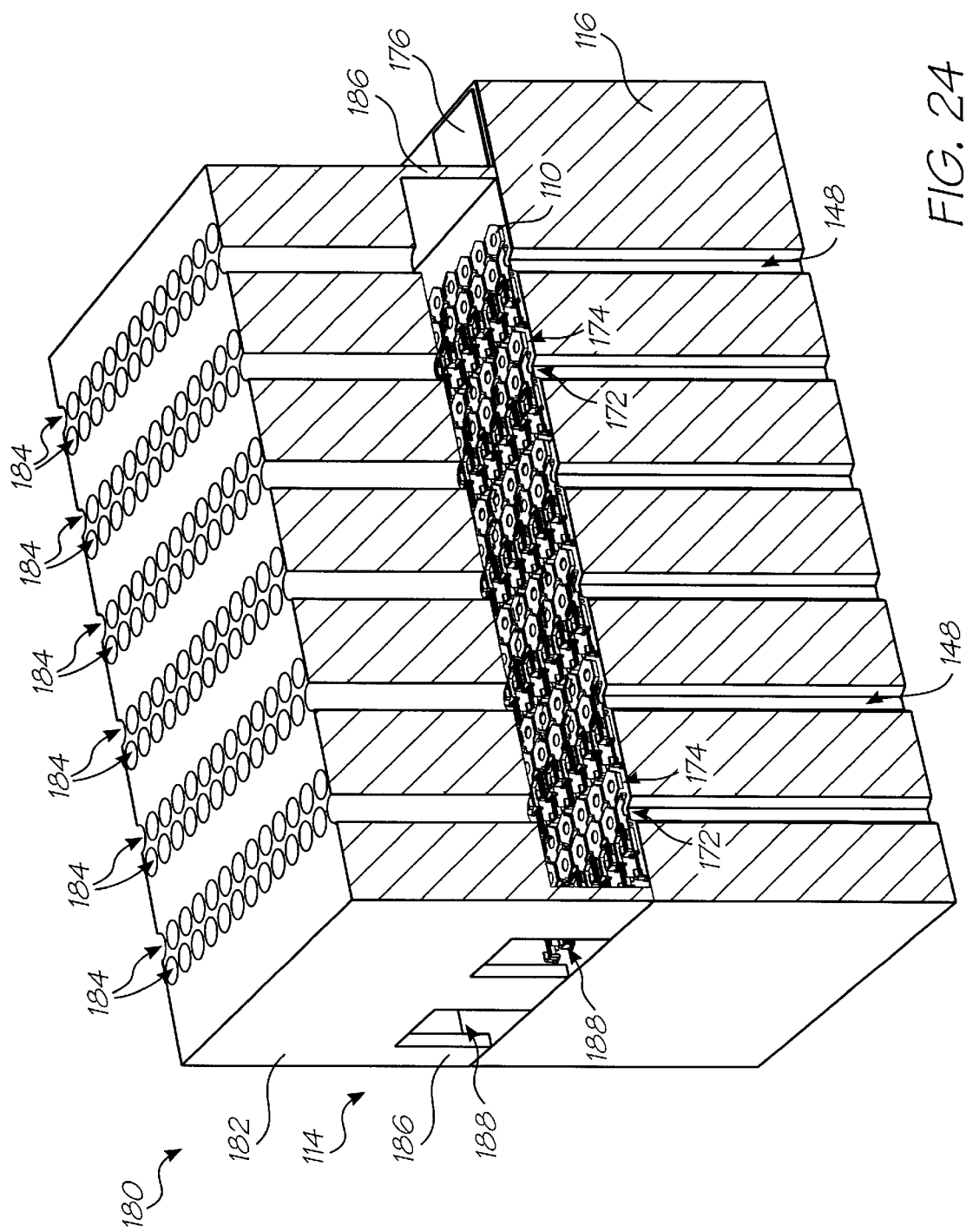
FIG. 24 shows a three dimensional view of an ink jet printhead including a nozzle guard.

Referring to FIG. 24 of the drawings, a development of the invention is shown. With reference to the previous drawings, like reference numerals refer to like parts, unless otherwise specified.

In this development, a nozzle guard 180 is mounted on the substrate 116 of the array 114. The nozzle guard 180 includes a body member 182 having a plurality of passages 184 defined therethrough. The passages 184 are in register with the nozzle openings 124 of the nozzle assemblies 110 of the array 114 such that, when ink is ejected from any one of the nozzle openings 124, the ink passes through the associated passage 184 before striking the print media.

The body member 182 is mounted in spaced relationship relative to the nozzle assemblies 110 by limbs or struts 186. One of the struts 186 has air inlet openings 188 defined therein.

In use, when the array 114 is in operation, air is charged through the inlet openings 188 to be forced through the passages 184 together with ink travelling through the passages 184.

The ink is not entrained in the air as the air is charged through the passages 184 at a different velocity from that of the ink droplets 164. For example, the ink droplets 164 are ejected from the nozzles 122 at a velocity of approximately 3 m/s. The air is charged through the passages 184 at a velocity of approximately 1 m/s.

The purpose of the air is to maintain the passages 184 clear of foreign particles. A danger exists that these foreign particles, such as dust particles, could fall onto the nozzle assemblies 110 adversely affecting their operation. With the provision of the air inlet openings 88 in the nozzle guard 180 this problem is, to a large extent, obviated.

Referring now to FIGS. 25 to 27 of the drawings, a process for manufacturing the nozzle assemblies 110 is described.

Starting with the silicon substrate or wafer 116, the dielectric layer 118 is deposited on a surface of the wafer 116. The dielectric layer 118 is in the form of approximately 1.5 microns of CVD oxide. Resist is spun on to the layer 118 and the layer 118 is exposed to mask 200 and is subsequently developed.

After being developed, the layer 118 is plasma etched down to the silicon layer 116. The resist is then stripped and the layer 118 is cleaned. This step defines the ink inlet aperture 142.

Figure 25A:
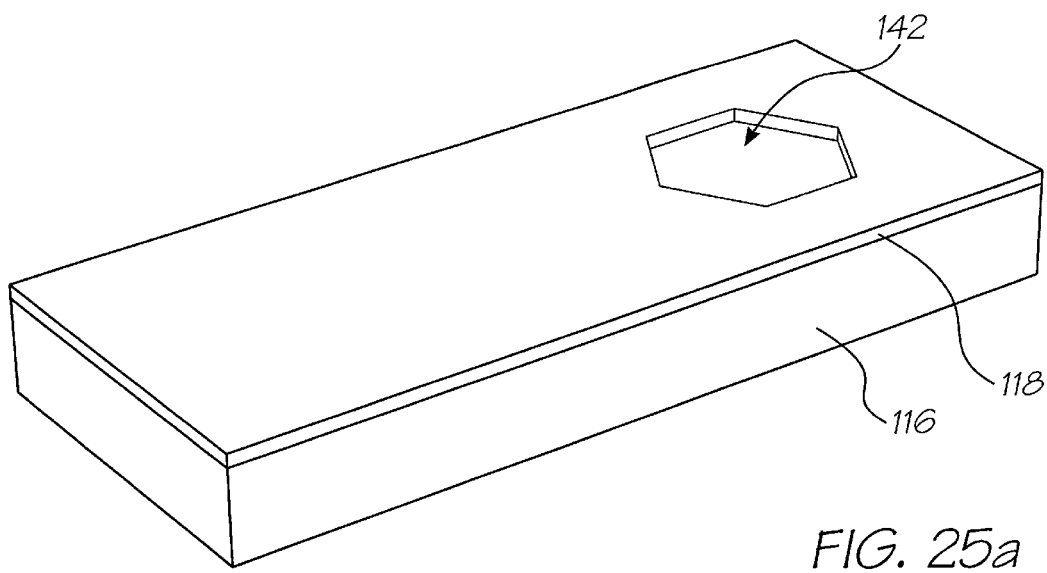
FIGS. 25a to 25r show three-dimensional views of steps in the manufacture of a nozzle assembly of an ink jet printhead.
Figure 26A:
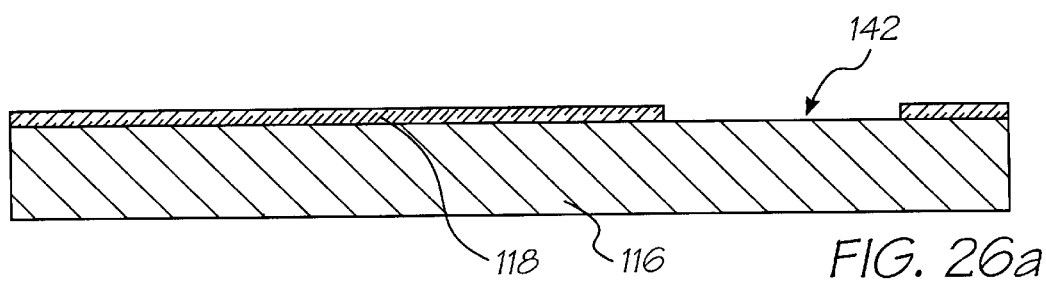
FIGS. 26a to 26r show sectional side views of the manufacturing steps.
Figure 27A:
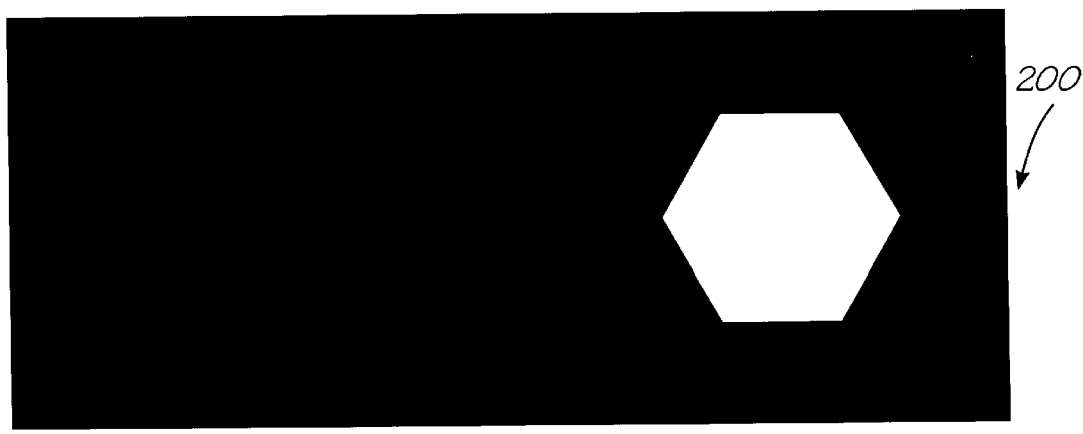
FIGS. 27a to 27k show layouts of masks used in various steps in the manufacturing process.
Figure 25B:
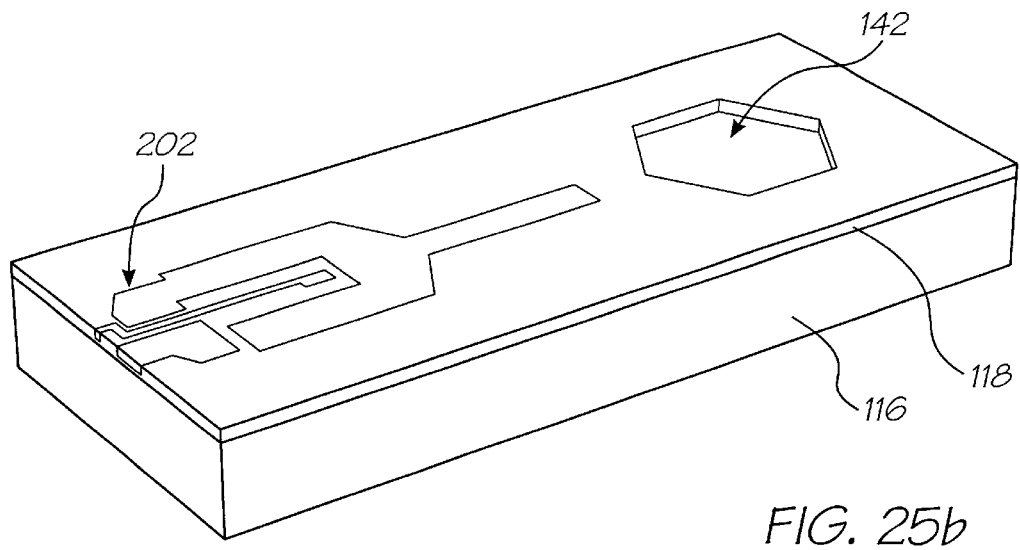
Figure 26B:
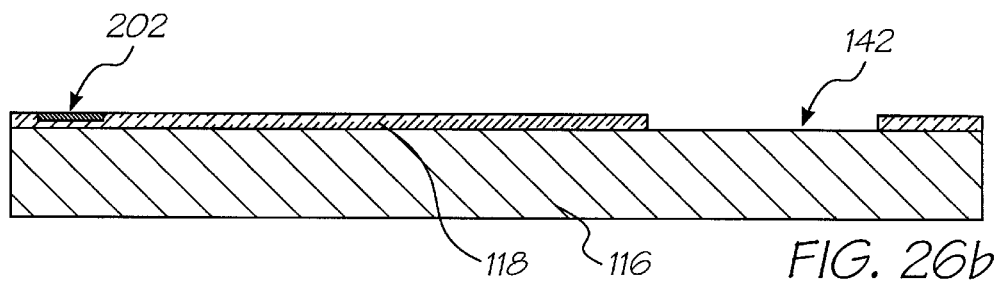
Figure 27B:
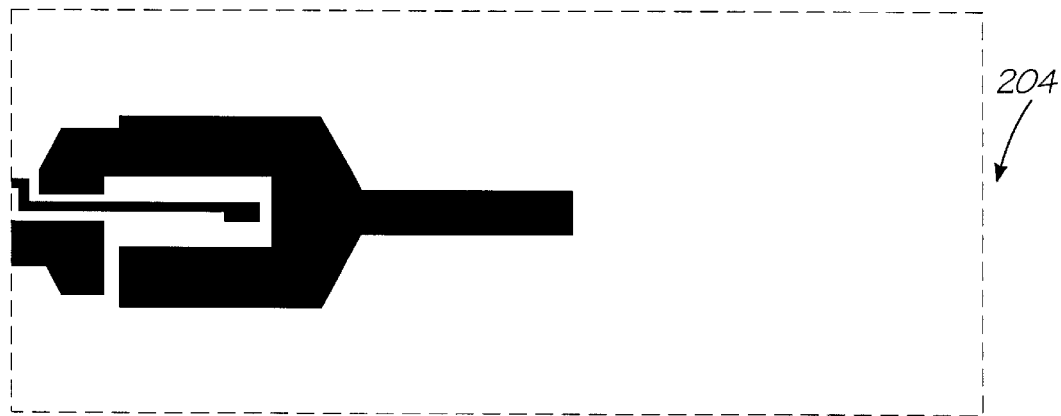
Figure 25C:
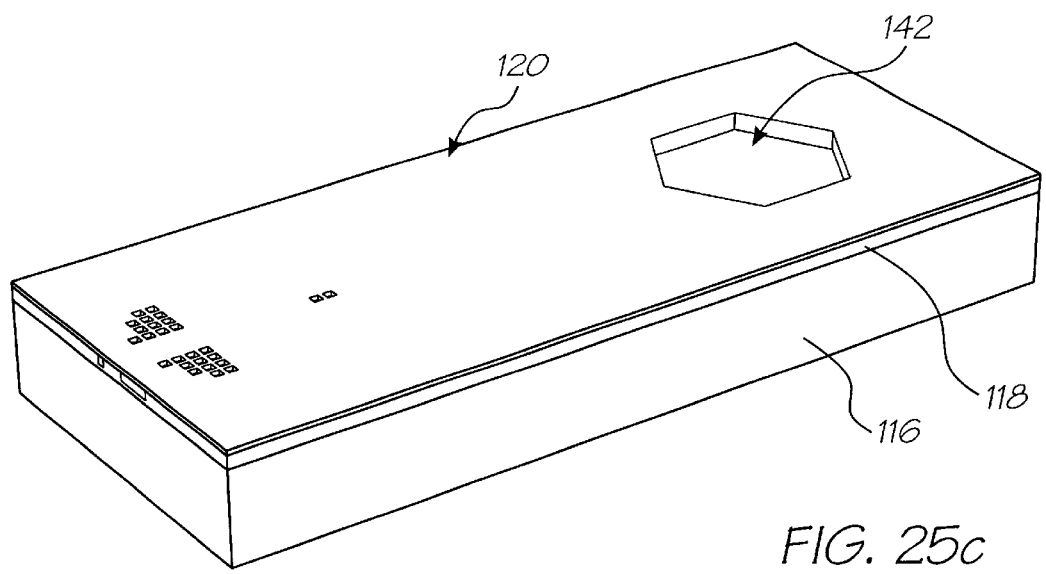
Figure 26C:
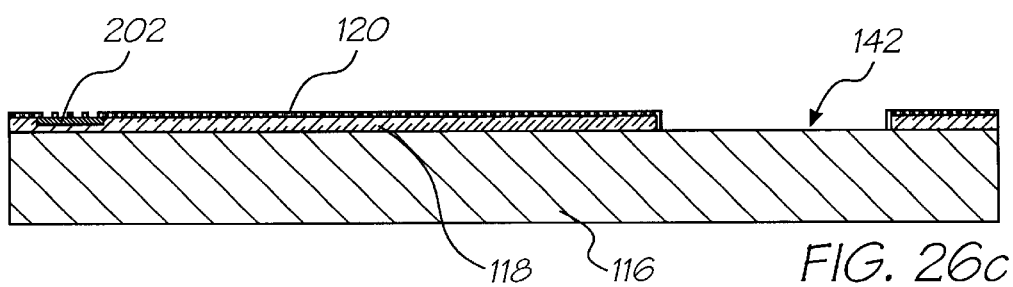
Figure 27C:
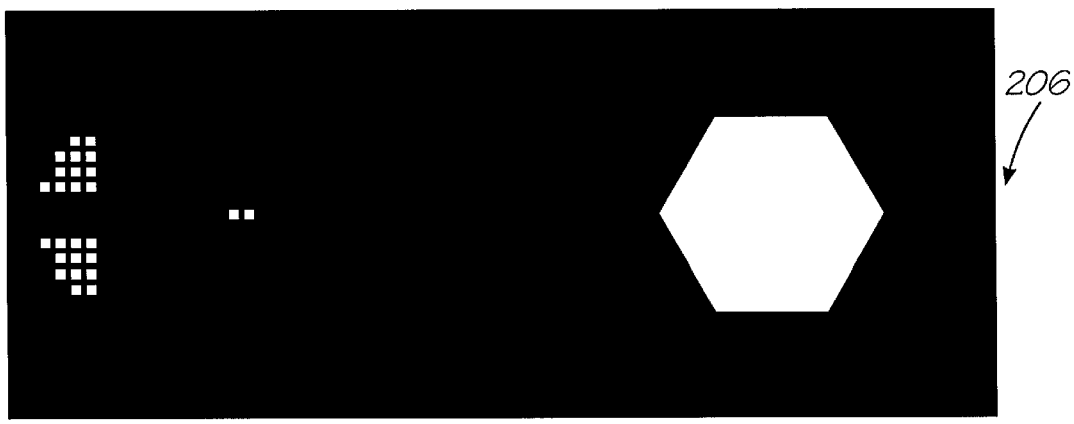
Figure 25D:
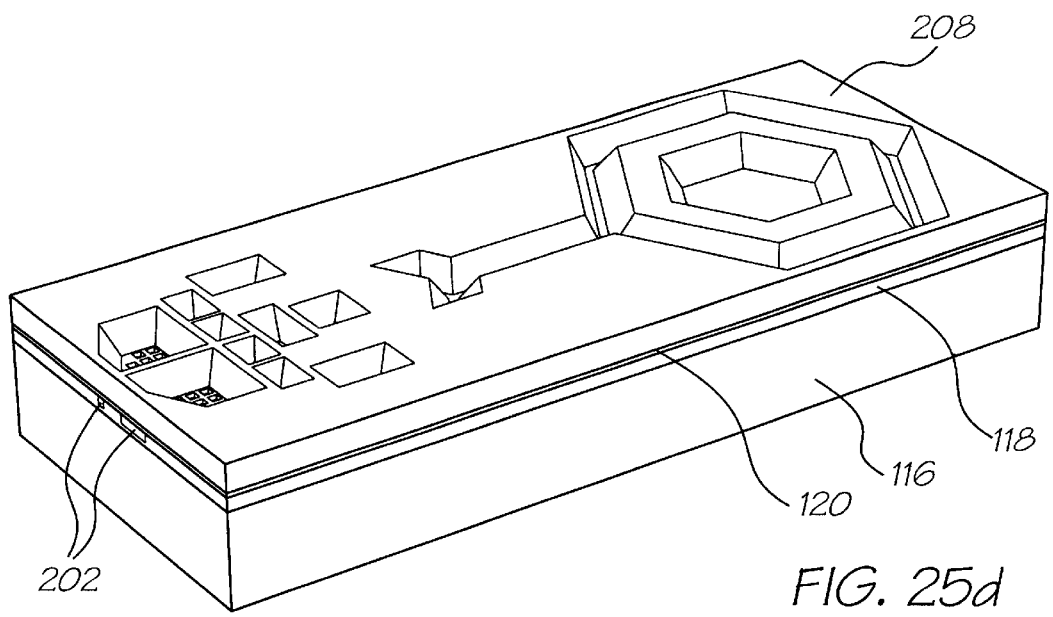
Figure 26D:
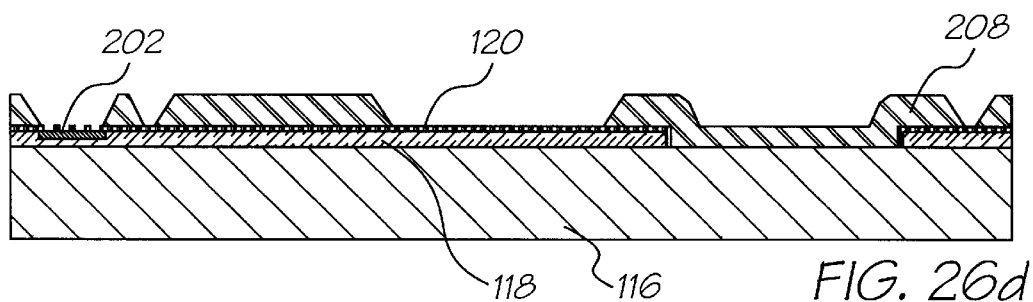
Figure 27D:
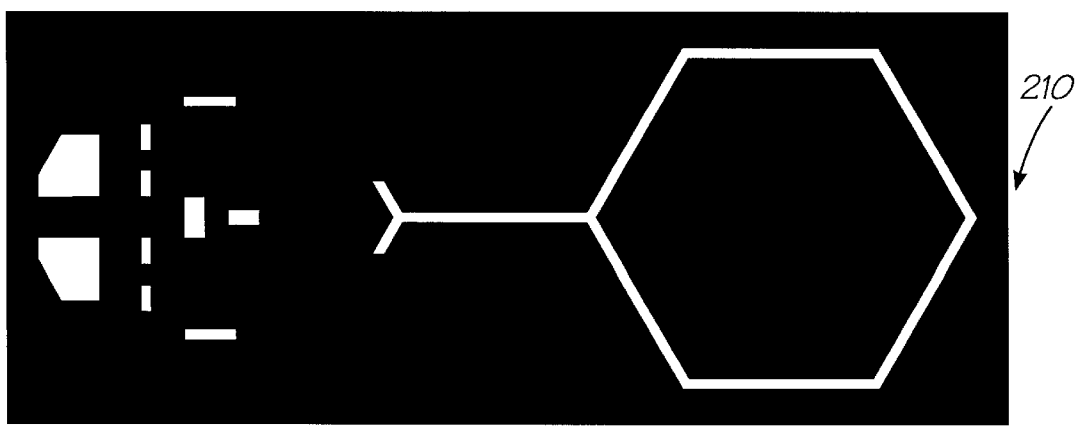

In FIG. 25b of the drawings, approximately 0.8 microns of aluminum 202 is deposited on the layer 118. Resist is spun on and the aluminum 202 is exposed to mask 204 and developed. The aluminum 202 is plasma etched down to the oxide layer 118, the resist is stripped and the device is cleaned. This step provides the bond pads and interconnects to the ink jet actuator 128. This interconnect is to an NMOS drive transistor and a power plane with connections made in the CMOS layer (not shown).

Approximately 0.5 microns of PECVD nitride is deposited as the CMOS passivation layer 120. Resist is spun on and the layer 120 is exposed to mask 206 whereafter it is developed. After development, the nitride is plasma etched down to the aluminum layer 202 and the silicon layer 116 in the region of the inlet aperture 142. The resist is stripped and the device cleaned.

A layer 208 of a sacrificial material is spun on to the layer 120. The layer 208 is 6 microns of photo-sensitive polyimide or approximately 4 µm of high temperature resist. The layer 208 is softbaked and is then exposed to mask 210 whereafter it is developed. The layer 208 is then hardbaked at 400° C. for one hour where the layer 208 is comprised of polyimide or at greater than 300° C. where the layer 208 is high temperature resist. It is to be noted in the drawings that the pattern-dependent distortion of the polyimide layer 208 caused by shrinkage is taken into account in the design of the mask 210.

Figure 25E:
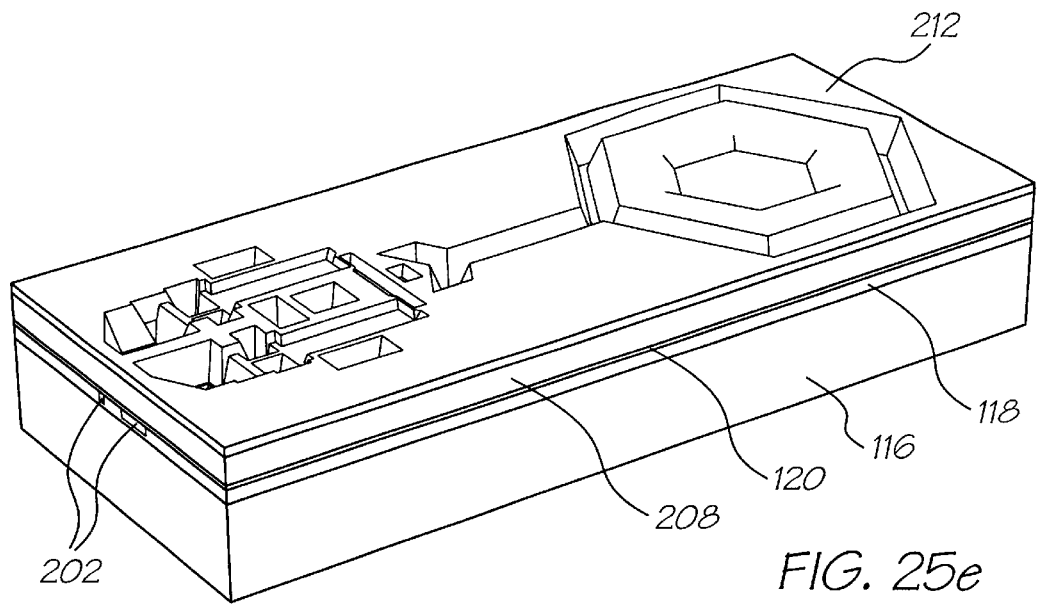
Figure 26E:
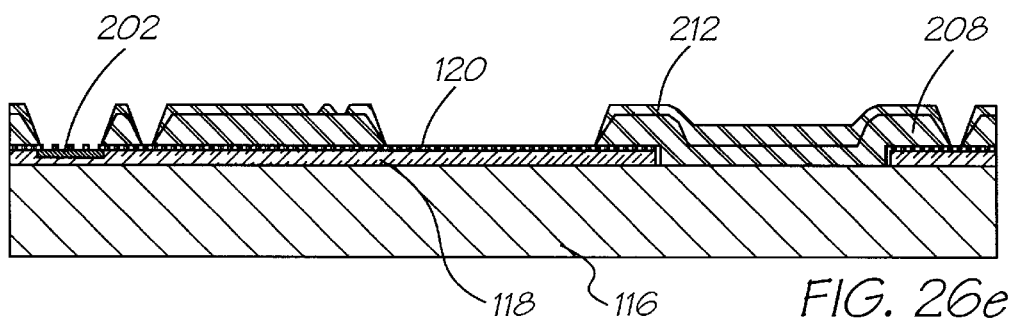
Figure 27E:
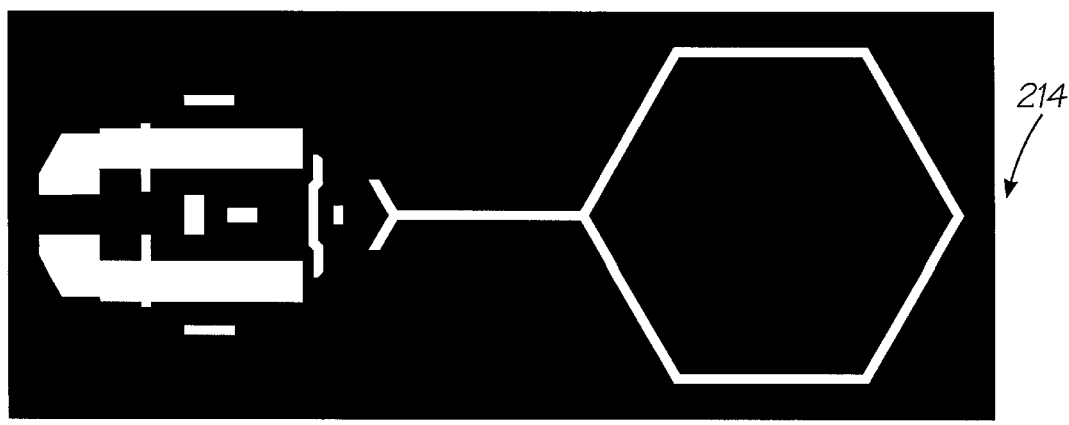
Figure 25F:
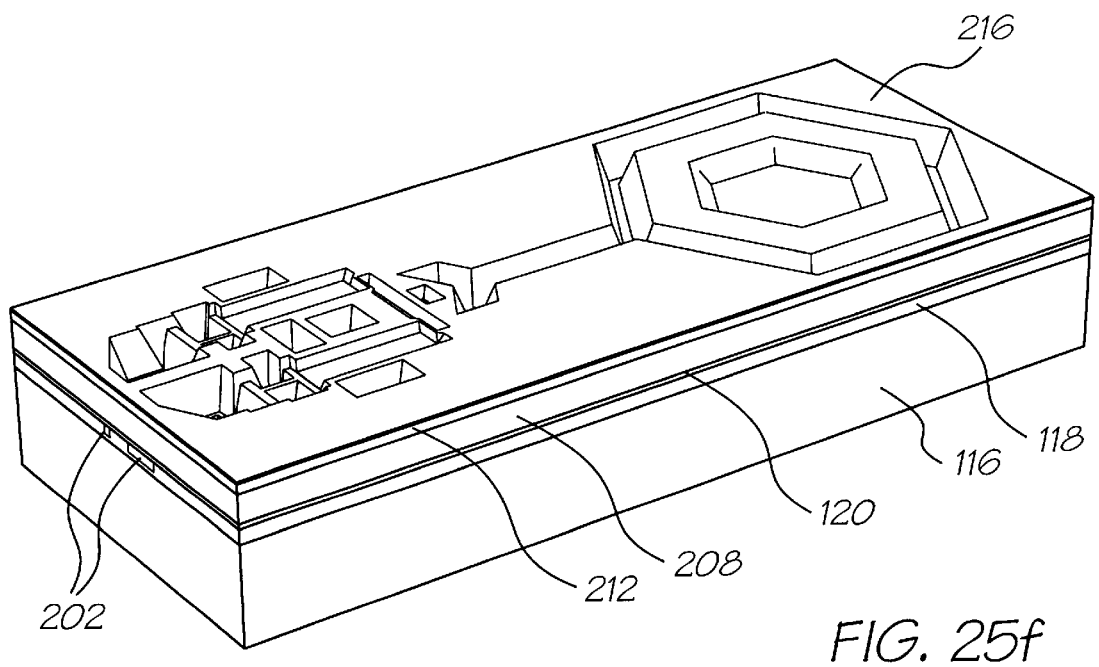
Figure 26F:
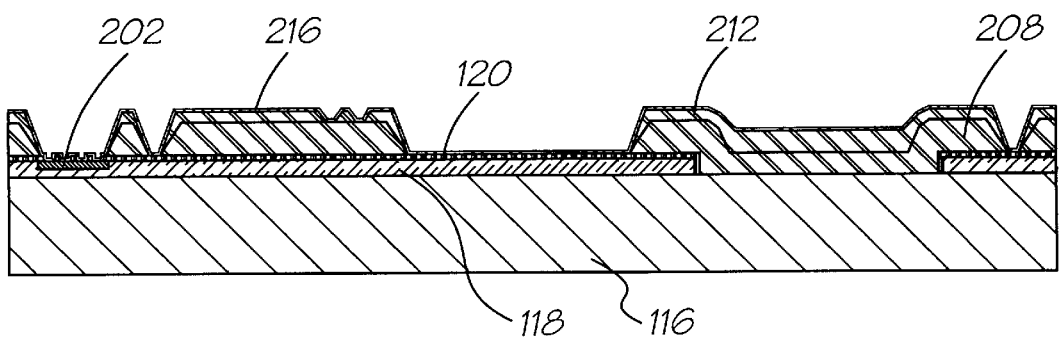
Figure 25G:
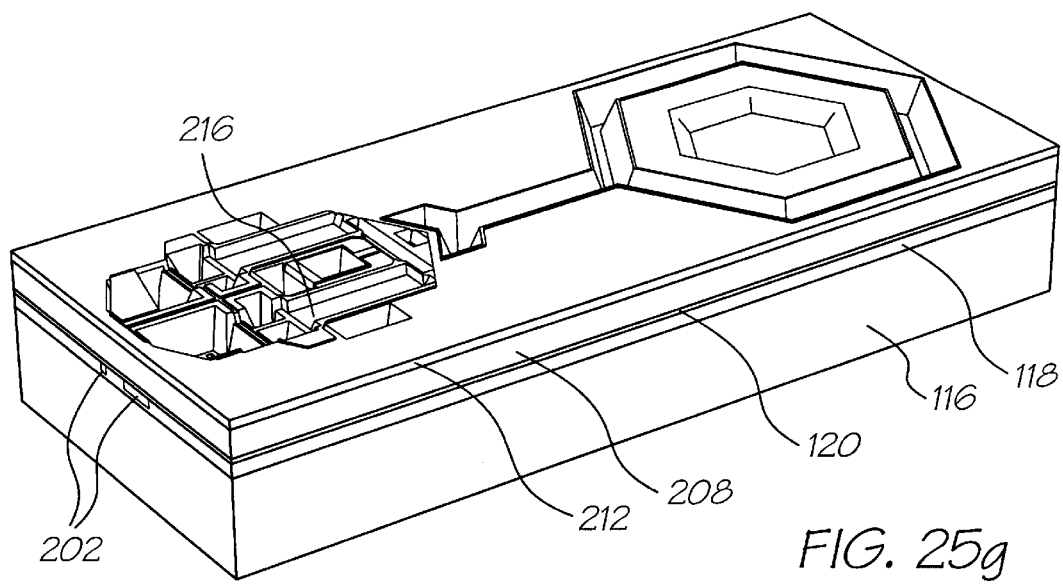
Figure 26G:
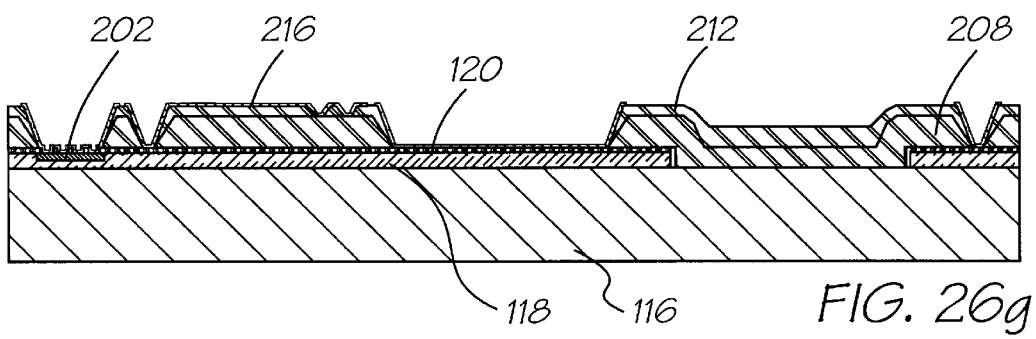
Figure 27F:
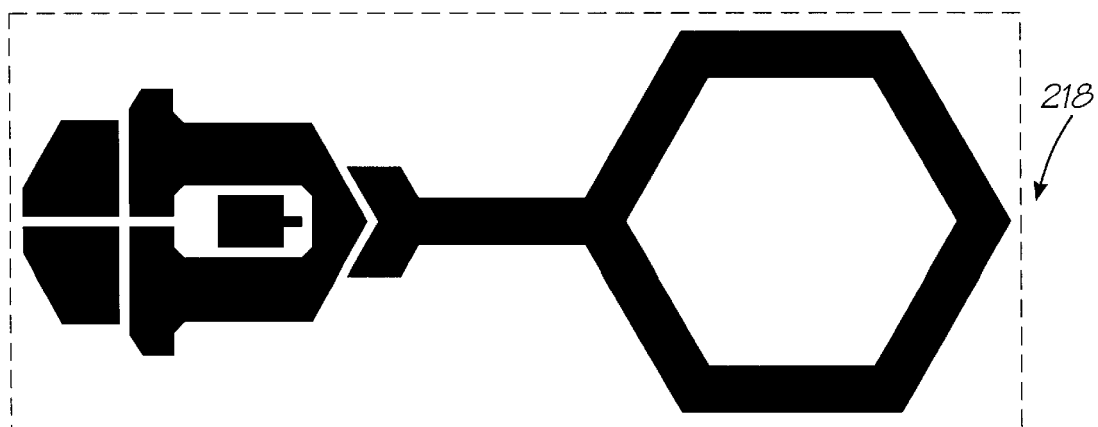
Figure 25H:
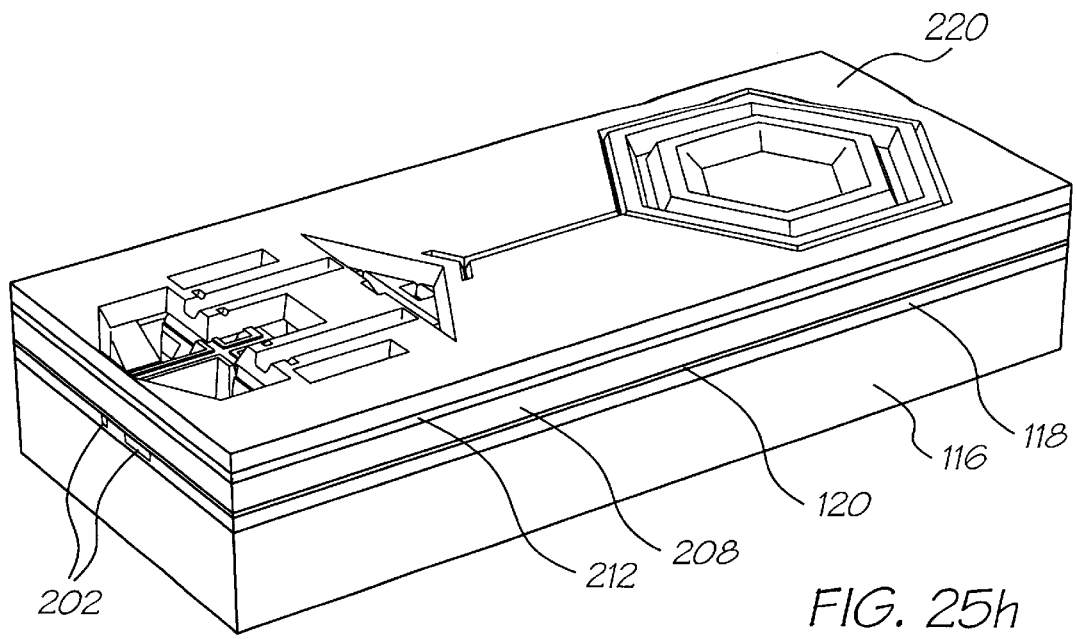
Figure 26H:
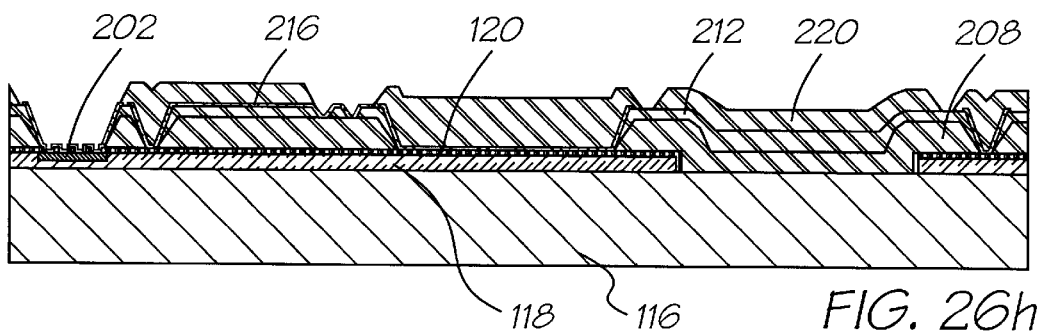
Figure 27G:
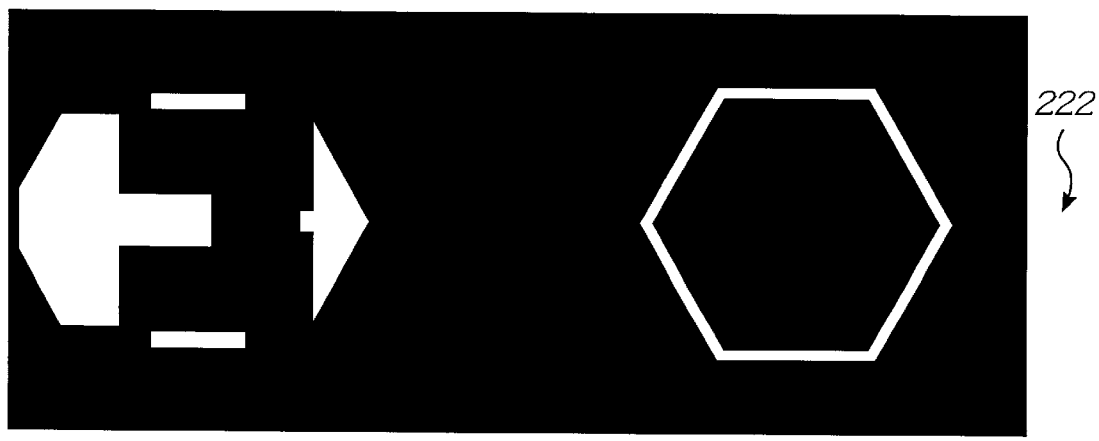
Figure 25I:
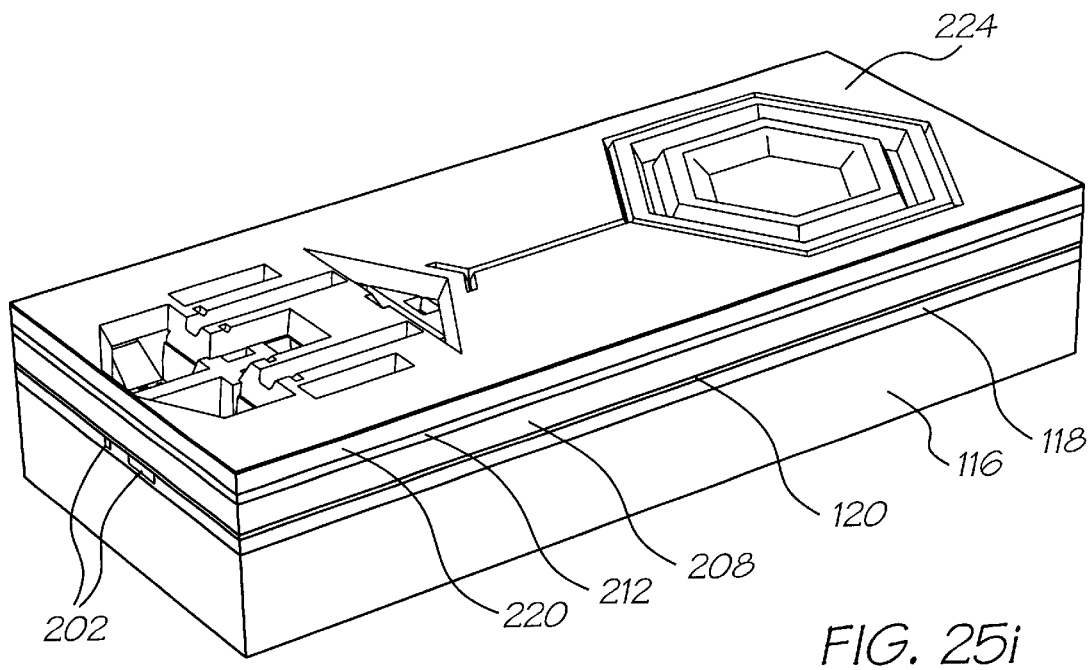
Figure 26I:
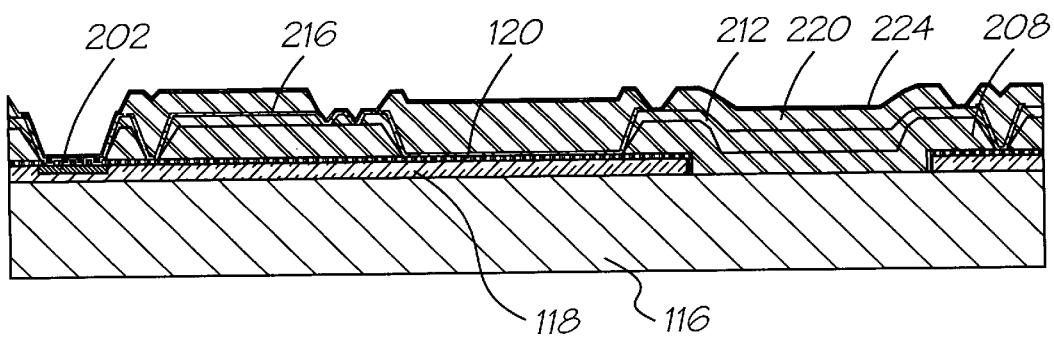
Figure 25J:
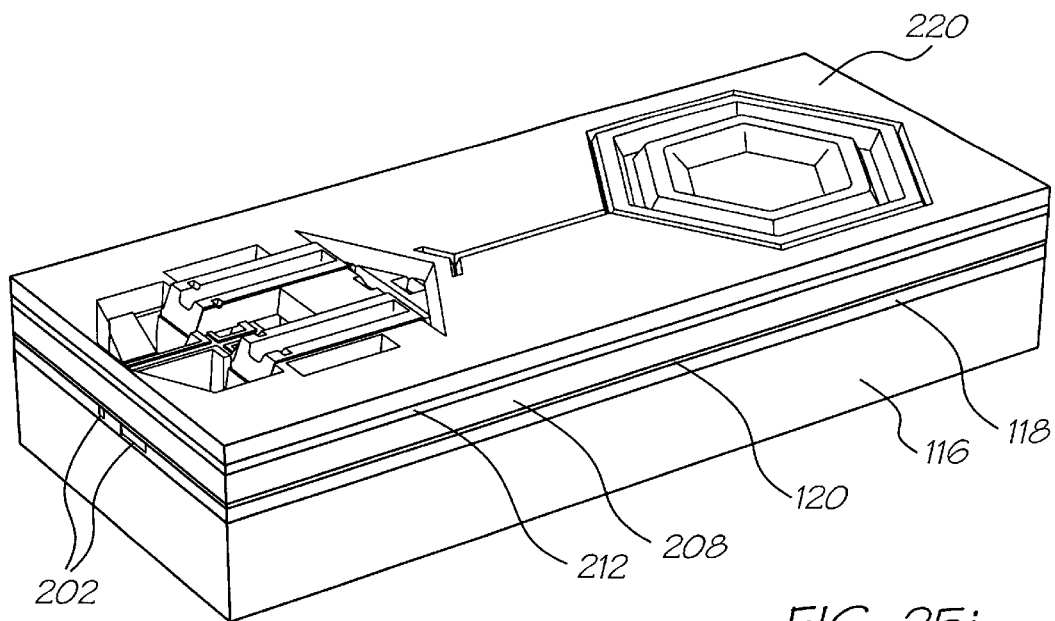
Figure 26J:
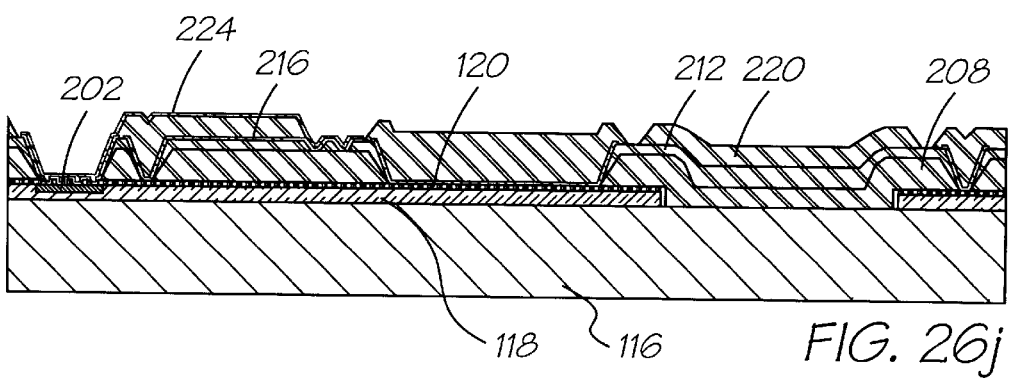
Figure 27H:
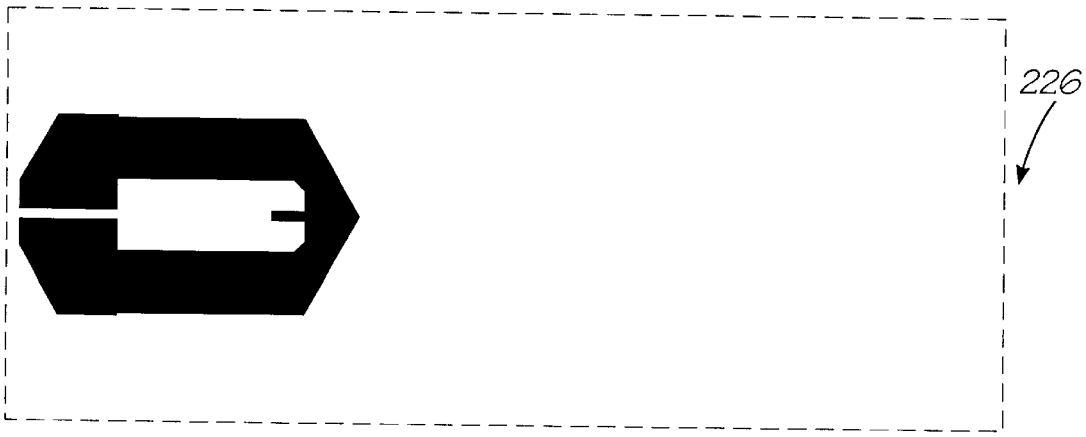
Figure 25K:
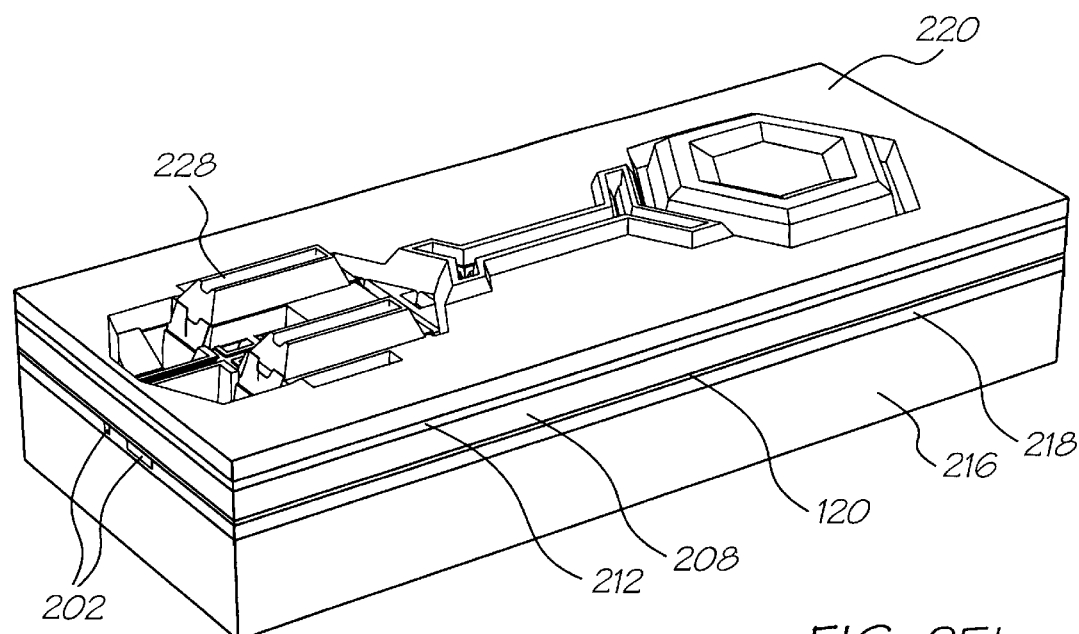
Figure 26K:
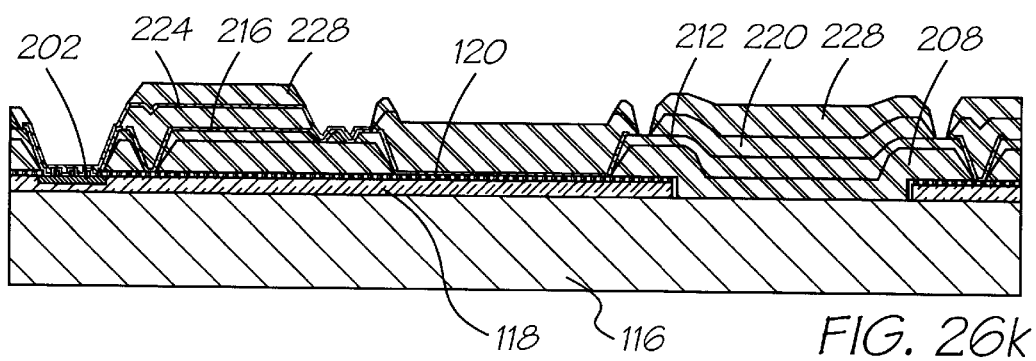
Figure 27I:
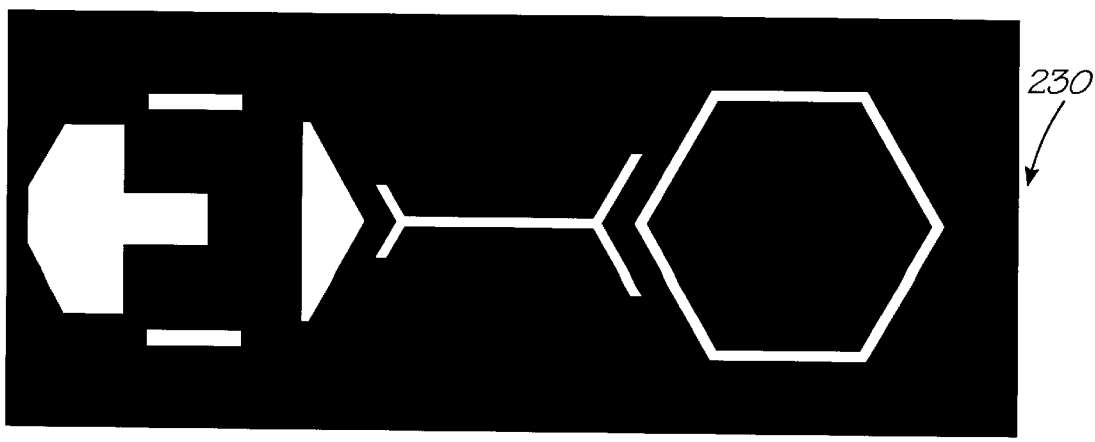
Figure 25I:
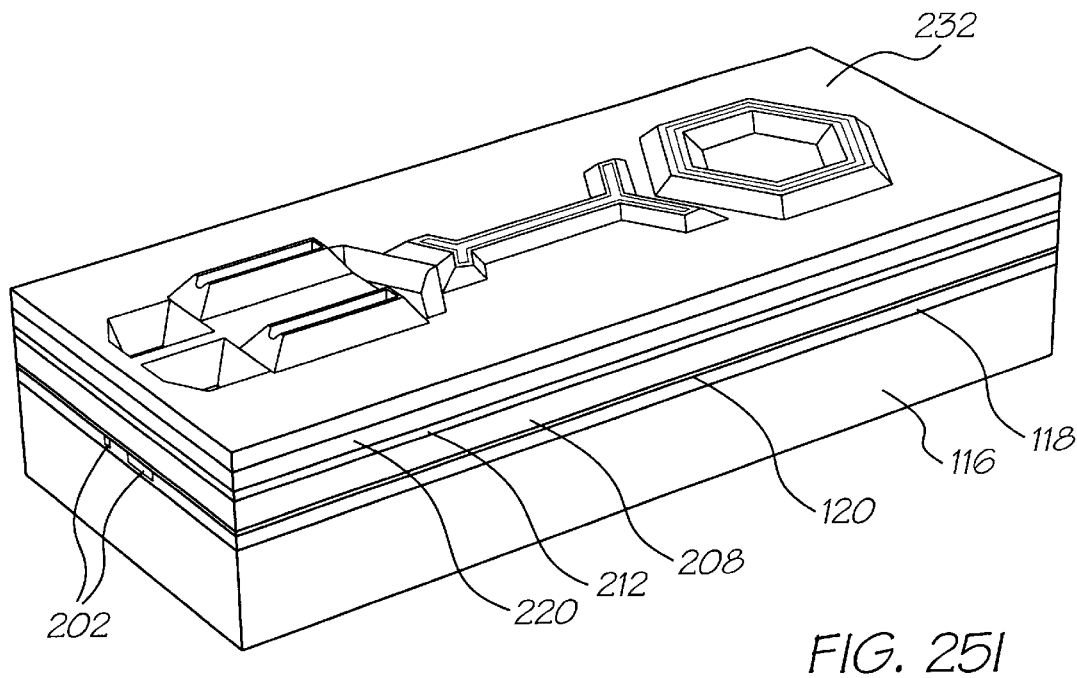
Figure 26I:
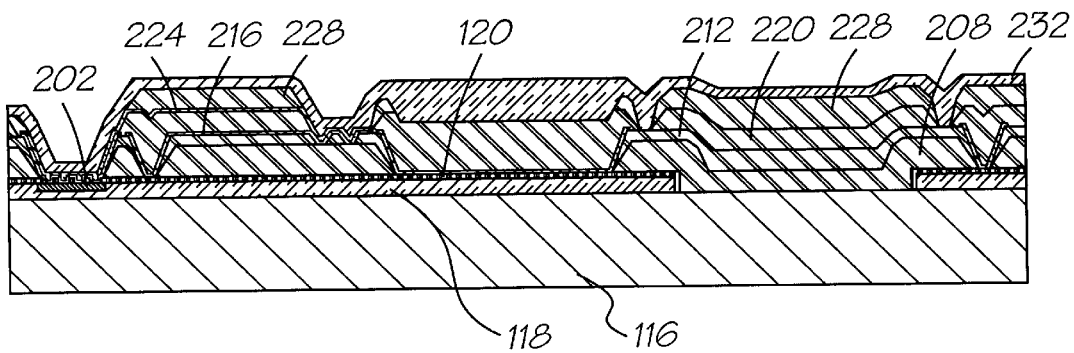
Figure 25M:
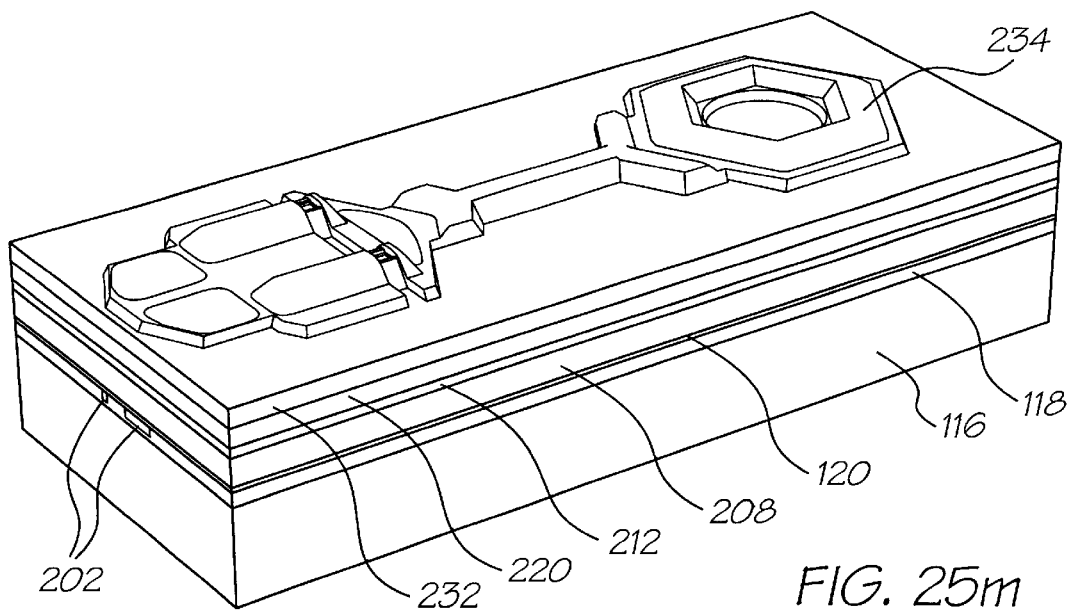
Figure 26M:
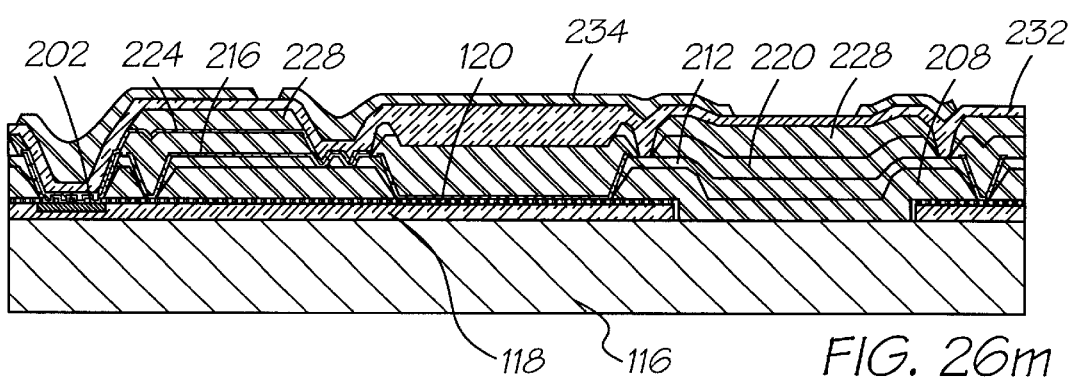
Figure 27J:
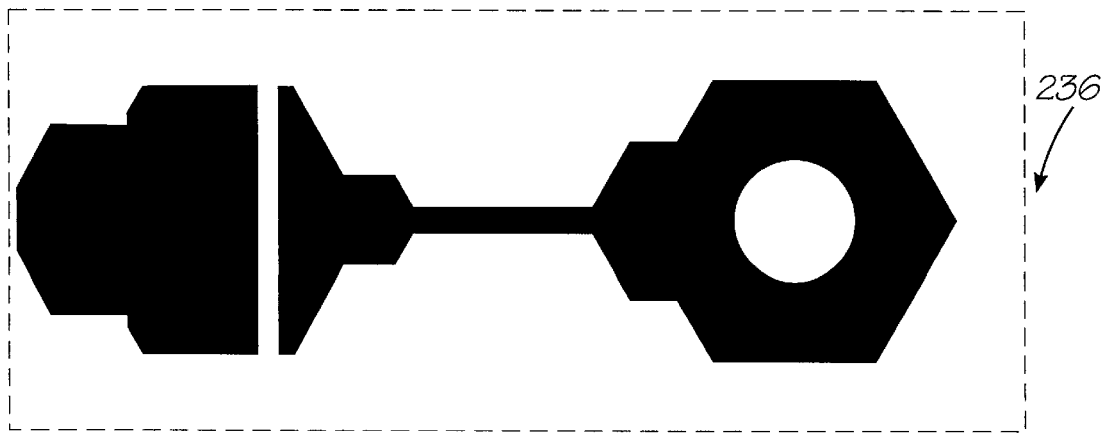
Figure 25N:
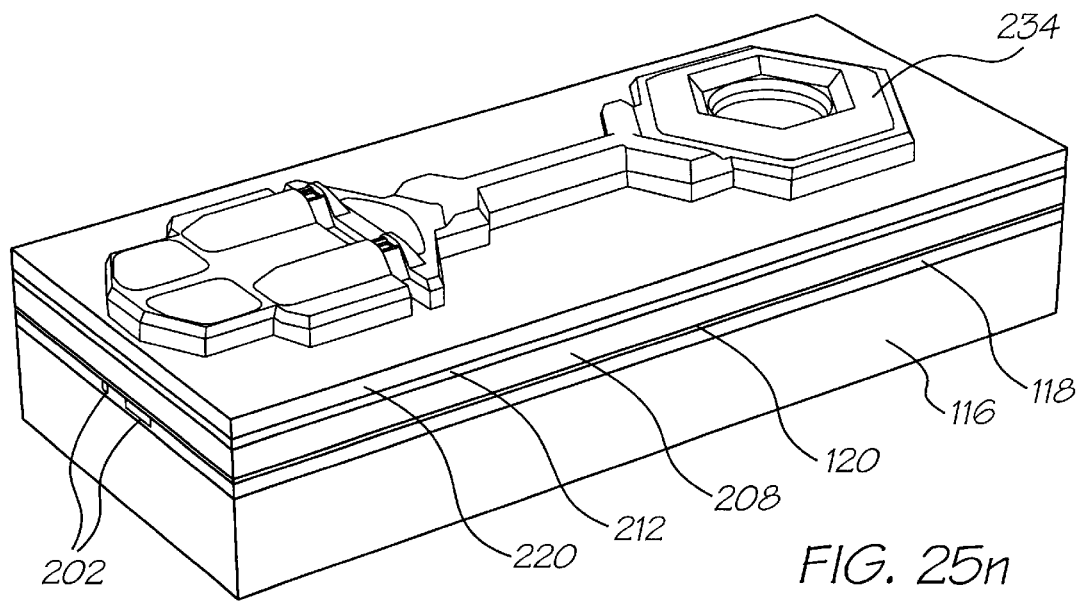
Figure 26N:
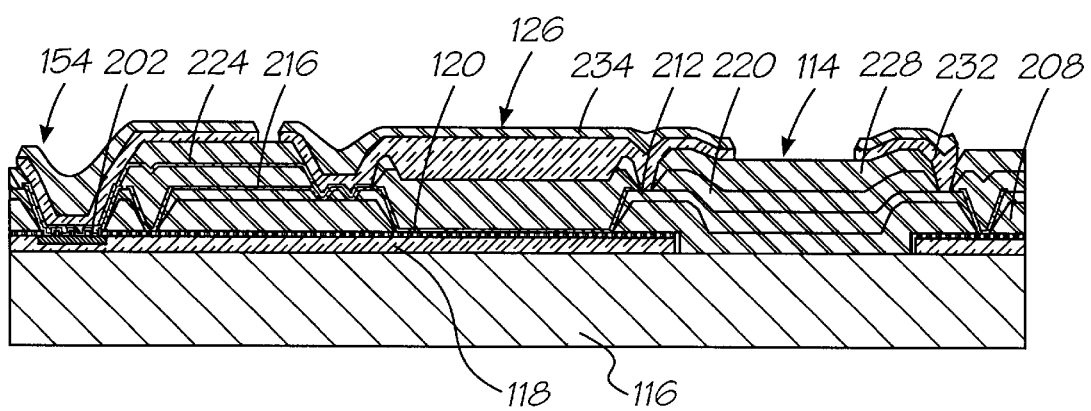
Figure 25O:
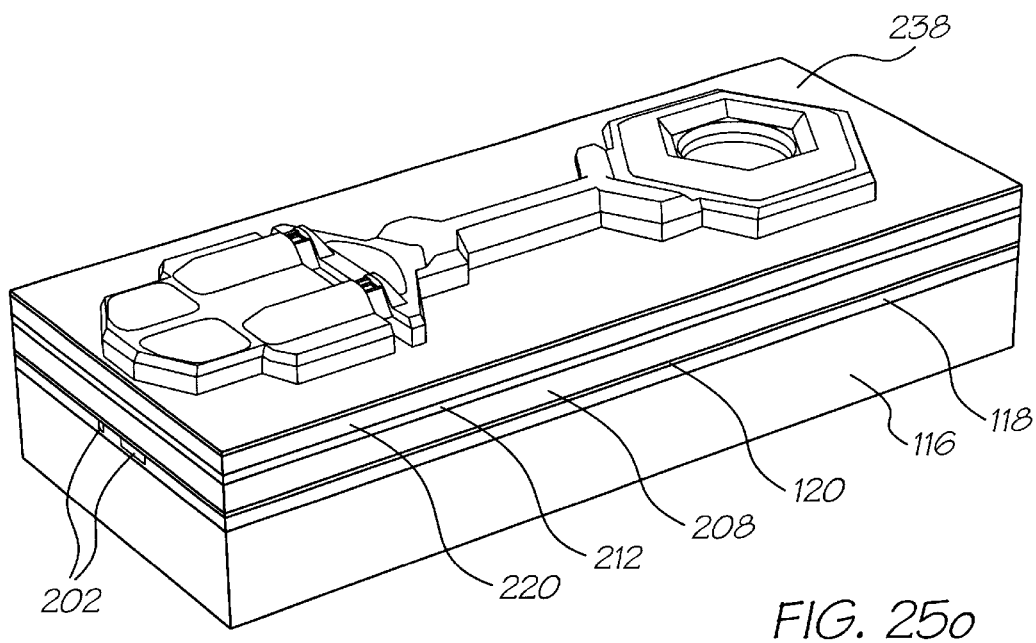
Figure 26O:
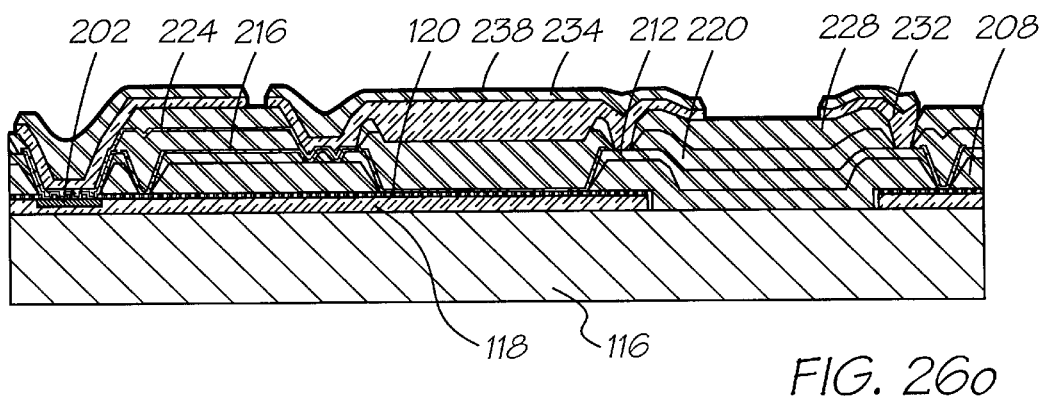

In the next step, shown in FIG. 25e of the drawings, a second sacrificial layer 212 is applied. The layer 212 is either 2 µm of photo-sensitive polyimide which is spun on or approximately 1.3 µm of high temperature resist. The layer 212 is softbaked and exposed to mask 214. After exposure to the mask 214, the layer 212 is developed. In the case of the layer 212 being polyimide, the layer 212 is hardbaked at 400° C. for approximately one hour. Where the layer 212 is resist, it is hardbaked at greater than 300° C. for approximately one hour.

A 0.2 micron multi-layer metal layer 216 is then deposited. Part of this layer 216 forms the passive beam 160 of the actuator 128.

The layer 216 is formed by sputtering 1,000 Å of titanium nitride (TiN) at around 300° C. followed by sputtering 50 Å of tantalum nitride (TaN). A further 1,000 Å of TiN is sputtered on followed by 50 Å of TaN and a further 1,000 Å of TiN.

Other materials which can be used instead of TiN are $TiB_2$, $MoSi_2$ or (Ti, Al)N.

The layer 216 is then exposed to mask 218, developed and plasma etched down to the layer 212 whereafter resist, applied for the layer 216, is wet stripped taking care not to remove the cured layers 208 or 212.

A third sacrificial layer 220 is applied by spinning on 4 µm of photo-sensitive polyimide or approximately 2.6 µm high temperature resist. The layer 220 is softbaked whereafter it is exposed to mask 222. The exposed layer is then developed followed by hardbaking. In the case of polyimide, the layer 220 is hardbaked at 400° C. for approximately one hour or at greater than 300° C. where the layer 220 comprises resist.

A second multi-layer metal layer 224 is applied to the layer 220. The constituents of the layer 224 are the same as the layer 216 and are applied in the same manner. It will be appreciated that both layers 216 and 224 are electrically conductive layers.

The layer 224 is exposed to mask 226 and is then developed. The layer 224 is plasma etched down to the polyimide or resist layer 220 whereafter resist applied for the layer 224 is wet stripped taking care not to remove the cured layers 208, 212 or 220. It will be noted that the remaining part of the layer 224 defines the active beam 158 of the actuator 128.

A fourth sacrificial layer 228 is applied by spinning on 4 µm of photo-sensitive polyimide or approximately 2.6 µm of high temperature resist. The layer 228 is softbaked, exposed to the mask 230 and is then developed to leave the island portions as shown in FIG. 9k of the drawings. The remaining portions of the layer 228 are hardbaked at 400° C. for approximately one hour in the case of polyimide or at greater than 300° C. for resist.

As shown in FIG. 25l of the drawing a high Young's modulus dielectric layer 232 is deposited. The layer 232 is constituted by approximately 1 µm of silicon nitride or aluminum oxide. The layer 232 is deposited at a temperature below the hardbaked temperature of the sacrificial layers 208, 212, 220, 228. The primary characteristics required for this dielectric layer 232 are a high elastic modulus, chemical inertness and good adhesion to TiN.

A fifth sacrificial layer 234 is applied by spinning on 2 µm of photo-sensitive polyimide or approximately 1.3 µm of high temperature resist. The layer 234 is softbaked, exposed to mask 236 and developed. The remaining portion of the layer 234 is then hardbaked at 400° C. for one hour in the case of the polyimide or at greater than 300° C. for the resist.

The dielectric layer 232 is plasma etched down to the sacrificial layer 228 taking care not to remove any of the sacrificial layer 234.

This step defines the nozzle opening 124, the lever arm 126 and the anchor 154 of the nozzle assembly 110.

A high Young's modulus dielectric layer 238 is deposited. This layer 238 is formed by depositing 0.2 µm of silicon nitride or aluminum nitride at a temperature below the hardbaked temperature of the sacrificial layers 208, 212, 220 and 228.

Figure 25P:
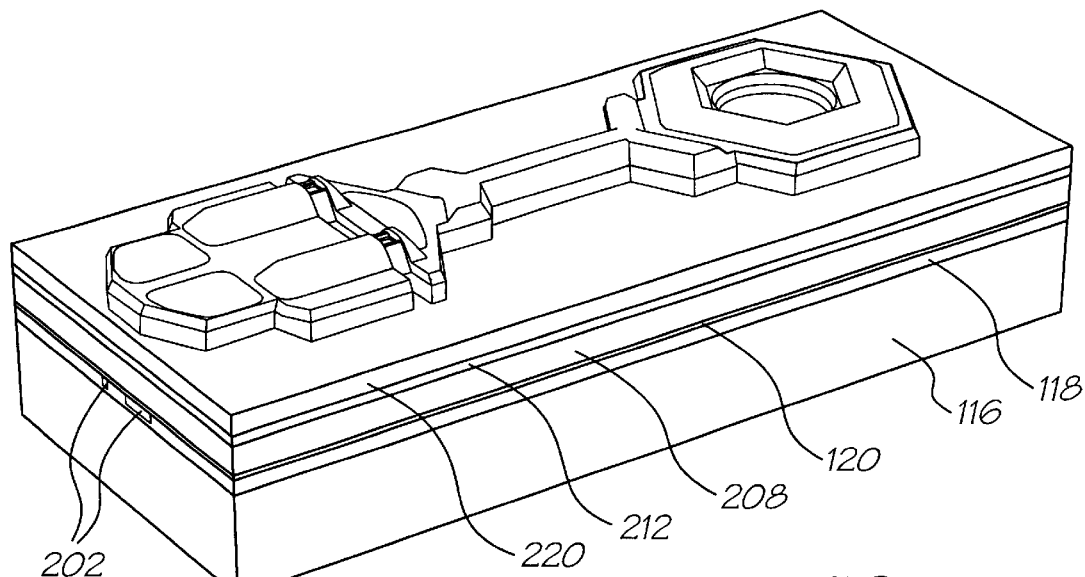
Figure 26P:
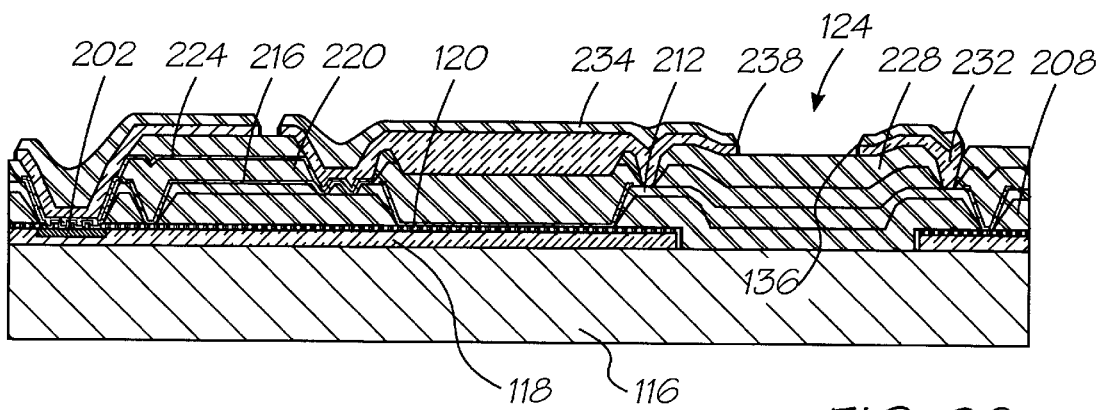
Figure 25Q:
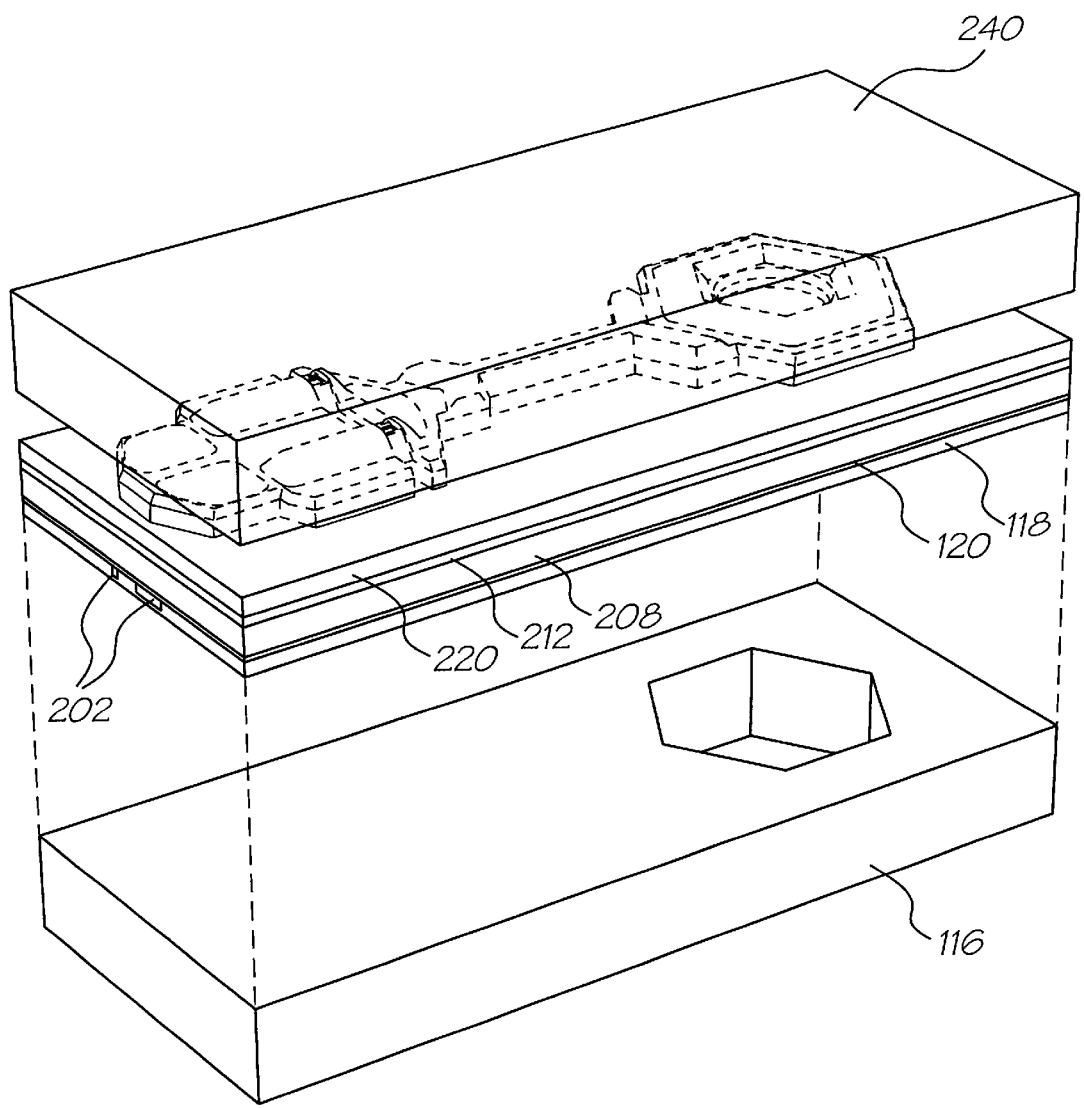
Figure 26Q:
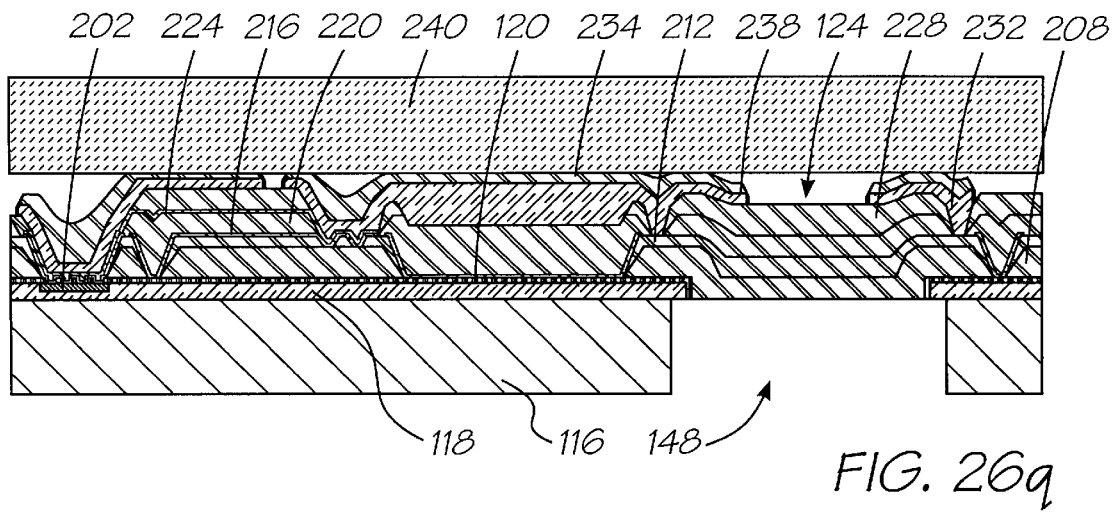
Figure 27K:
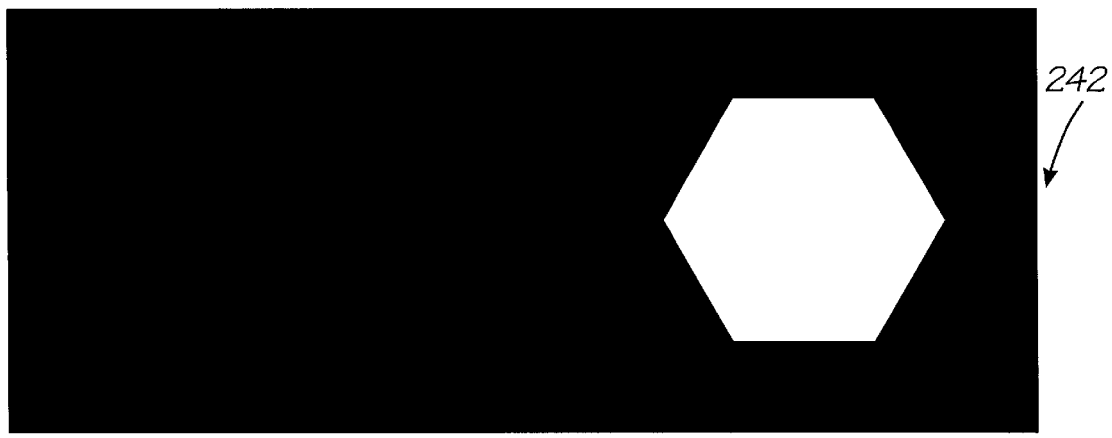

Then, as shown in FIG. 25p of the drawings, the layer 238 is anisotropically plasma etched to a depth of 0.35 microns. This etch is intended to clear the dielectric from all of the surface except the side walls of the dielectric layer 232 and the sacrificial layer 234. This step creates the nozzle rim 136 around the nozzle opening 124 which "pins" the meniscus of ink, as described above.

An ultraviolet (UV) release tape 240 is applied. 4 µm of resist is spun on to a rear of the silicon wafer 116. The wafer 116 is exposed to mask 242 to back etch the wafer 116 to define the ink inlet channel 148. The resist is then stripped from the wafer 116.

Figure 25R:
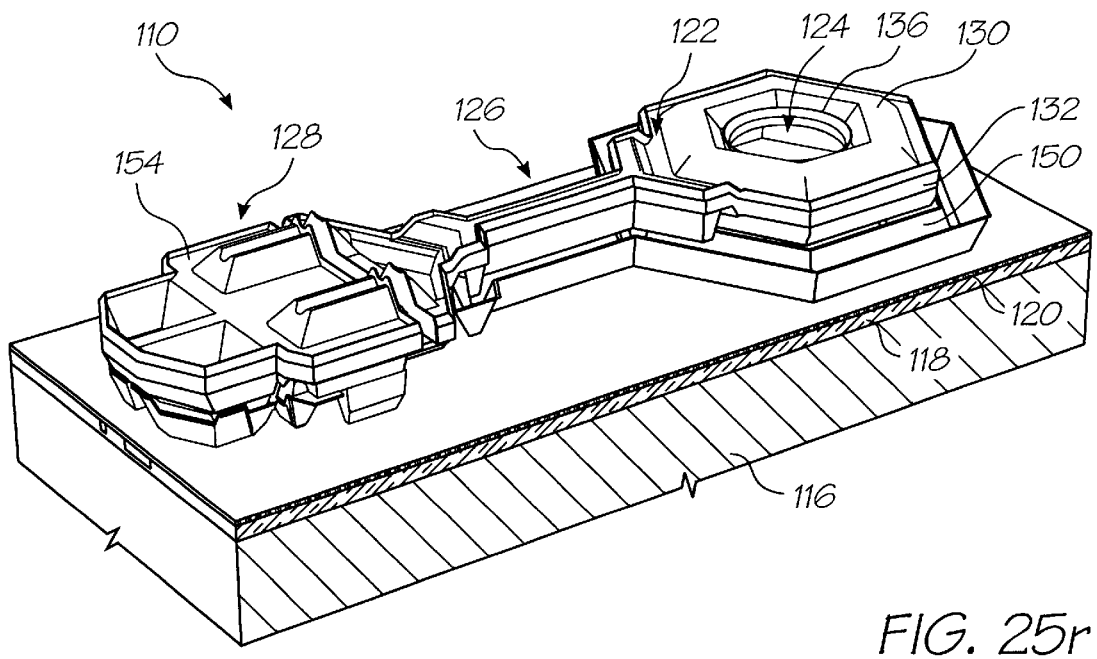
Figure 26R:
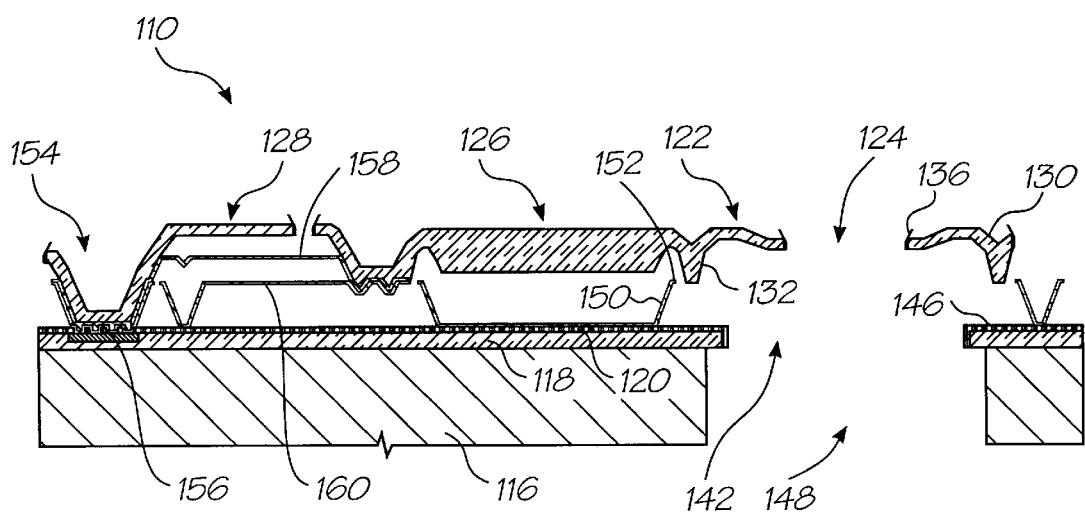
Figure 28A:
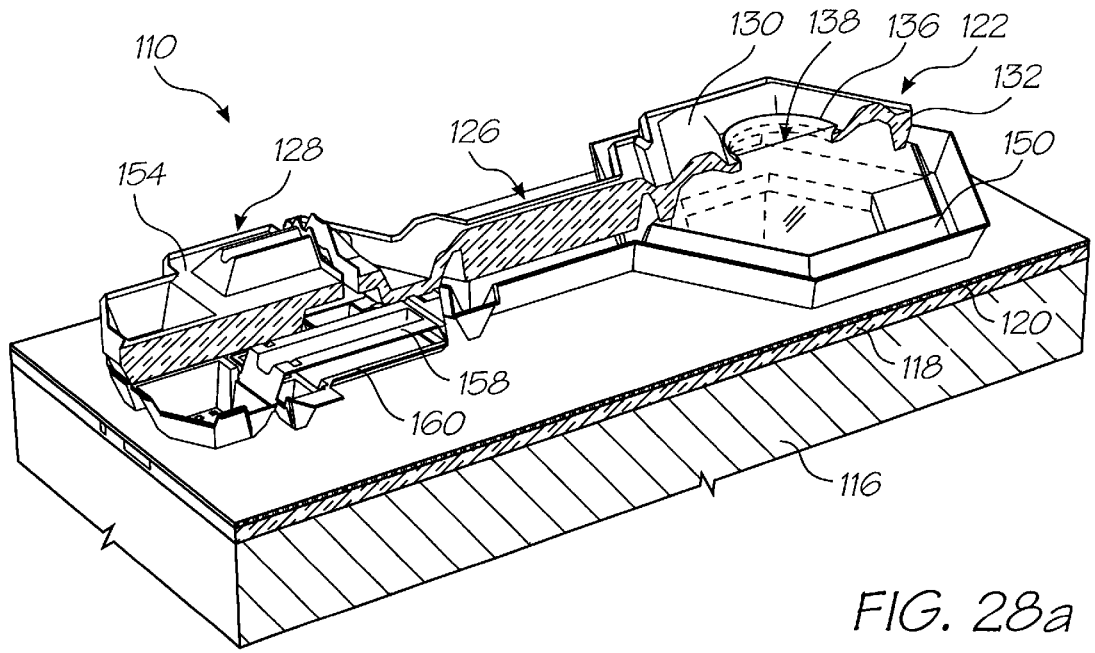
FIGS. 28a to 28c show three dimensional views of an operation of the nozzle assembly manufactured according to the method of FIGS. 25 and 26.
Figure 29A:
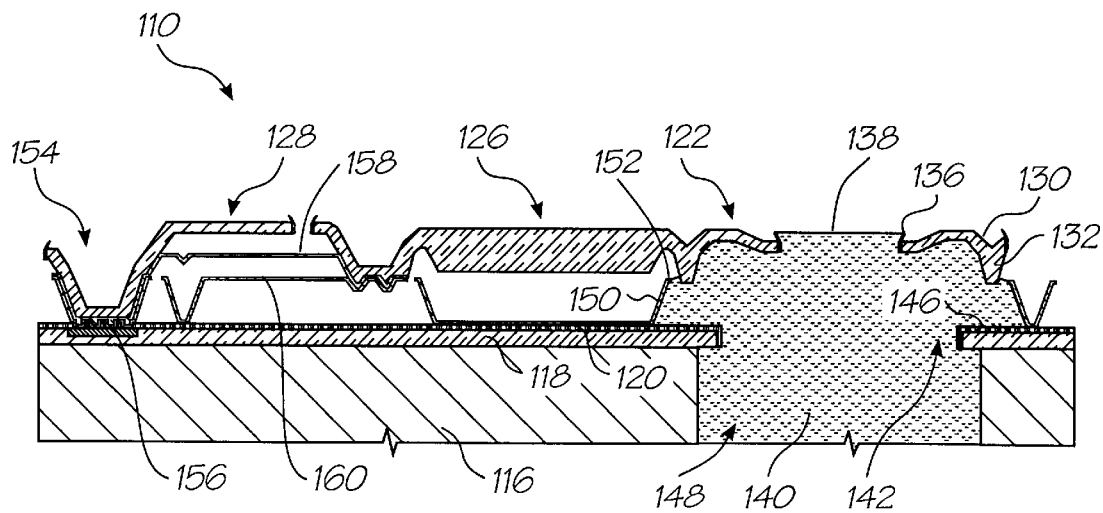
FIGS. 29a to 29c show sectional side views of an operation of the nozzle assembly manufactured according to the method of FIGS. 25 and 26.
Figure 28B:
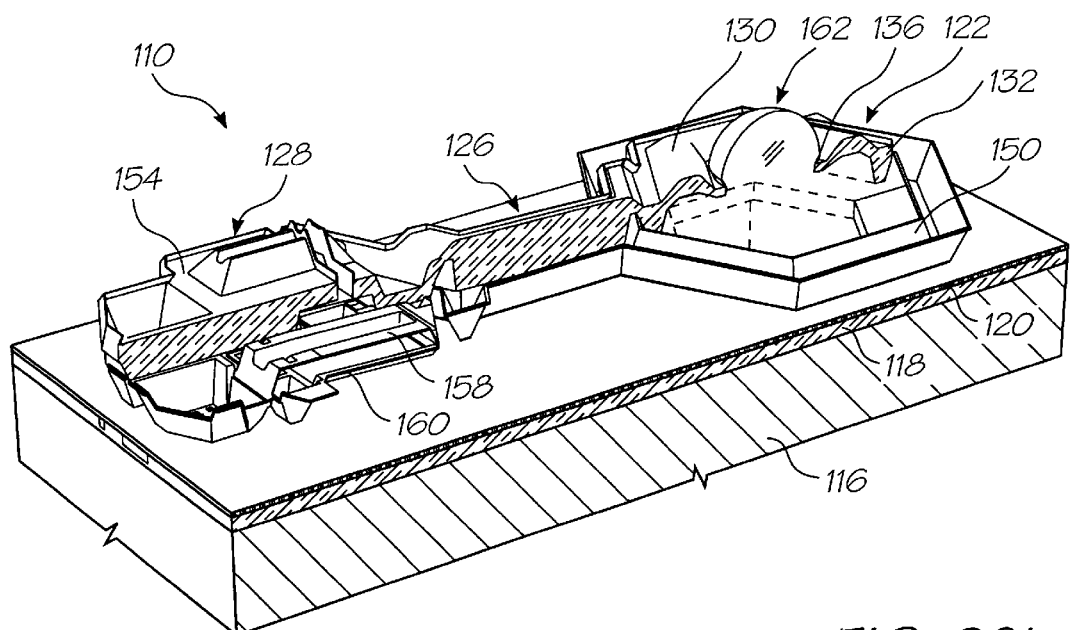
Figure 29B:
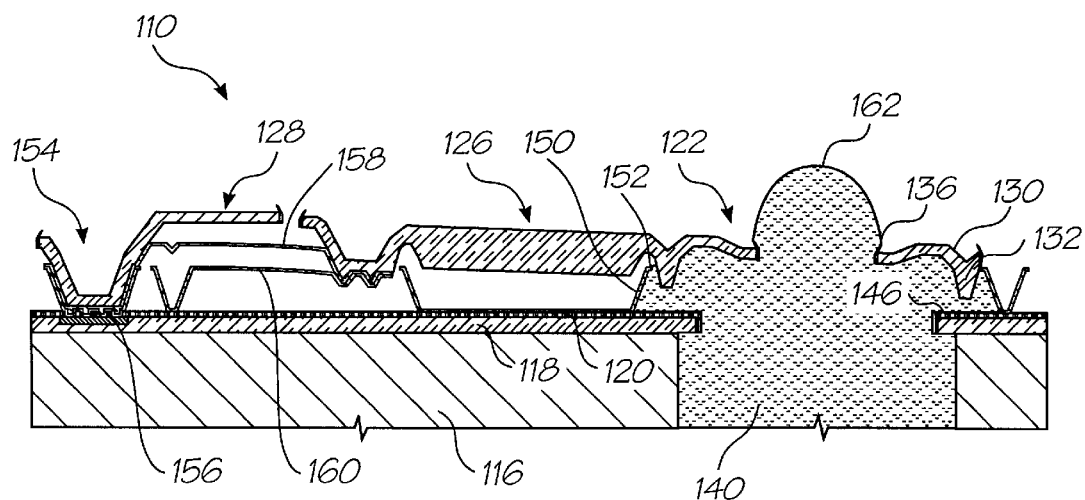
Figure 28C:
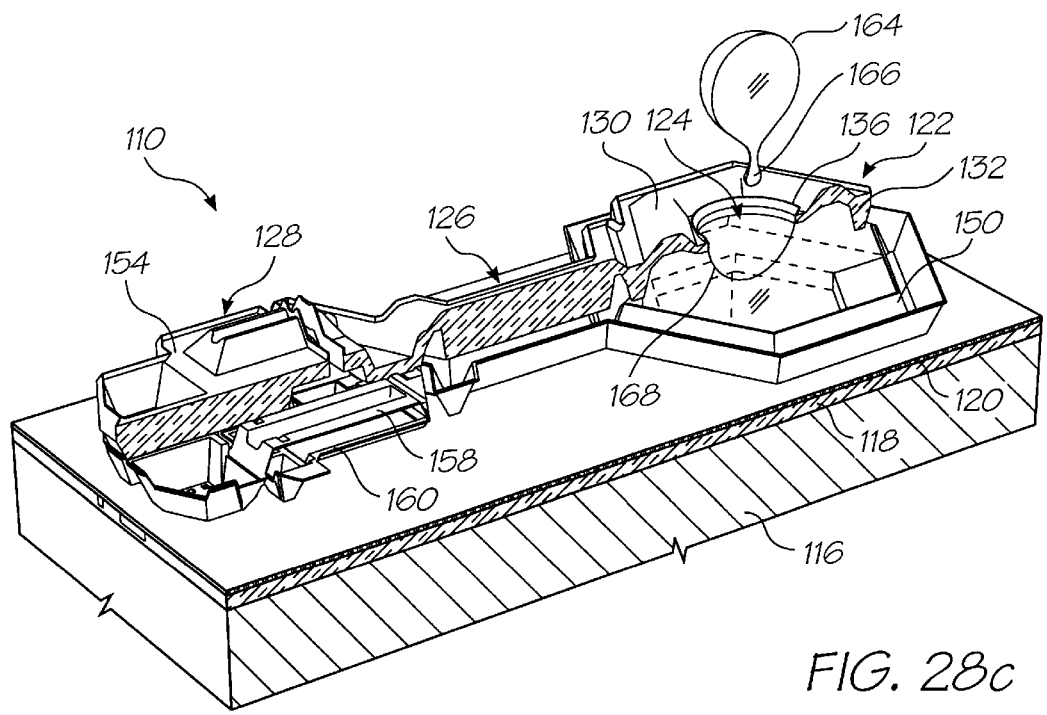
Figure 29C:
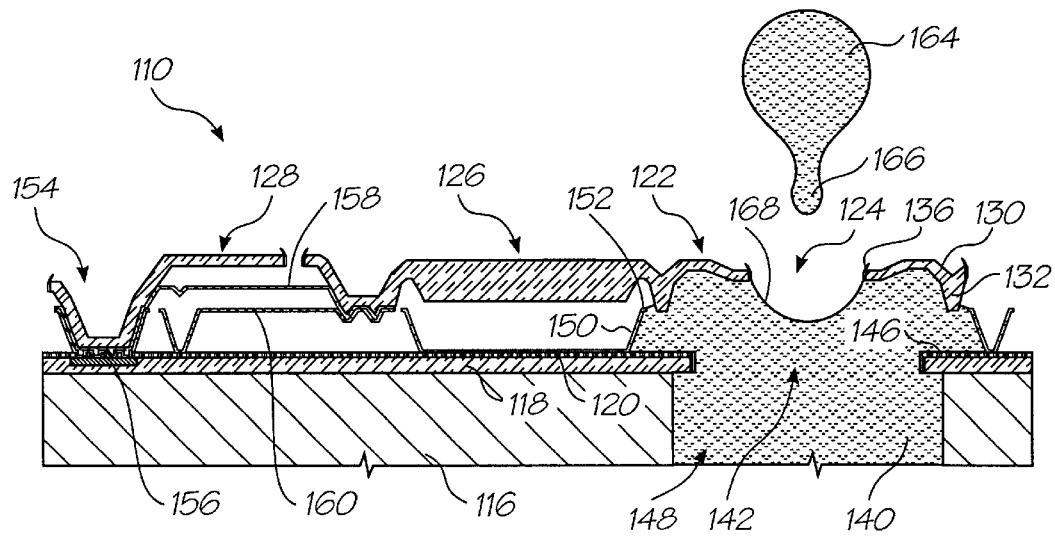

A further UV release tape (not shown) is applied to a rear of the wafer 16 and the tape 240 is removed. The sacrificial layers 208, 212, 220, 228 and 234 are stripped in oxygen plasma to provide the final nozzle assembly 110 as shown in FIGS. 25r and 26r of the drawings. For ease of reference, the reference numerals illustrated in these two drawings are the same as those in FIG. 18 of the drawings to indicate the relevant parts of the nozzle assembly 110. FIGS. 28 and 29 show the operation of the nozzle assembly 110, manufactured in accordance with the process described above with reference to FIGS. 25 and 26, and these figures correspond to FIGS. 19 to 21 of the drawings.

The presently disclosed ink jet printing technology is potentially suited to a wide range of printing system including: color and monochrome office printers, short run digital printers, high speed digital printers, offset press supplemental printers, low cost scanning printers high speed pagewidth printers, notebook computers with inbuilt pagewidth printers, portable color and monochrome printers, color and monochrome copiers, color and monochrome facsimile machines, combined printer, facsimile and copying machines, label printers, large format plotters, photograph copiers, printers for digital photographic "minilabs", video printers, PHOTO CD (PHOTO CD is a registered trade mark of the Eastman Kodak Company) printers, portable printers for PDAs, wallpaper printers, indoor sign printers, billboard printers, fabric printers, camera printers and fault tolerant commercial printer arrays.

It would be appreciated by a person skilled in the art that numerous variations and/or modifications may be made to the present invention as shown in the specific embodiments without departing from the spirit or scope of the invention as broadly described. The present embodiments are, therefore, to be considered in all respects to be illustrative and not restrictive.

I claim:

1. An ink jet nozzle assembly including a nozzle chamber containing ink to be ejected, said chamber including a fixed portion and a movable portion configured for relative movement in an ejection phase and alternate relative movement in a refill phase, wherein a fluidic seal comprising a meniscus formed by said ink extends between the movable portion and the fixed portion.

2. The ink jet nozzle assembly according to claim 1, wherein said movable portion is a thermal bend actuator.

3. The ink jet nozzle assembly according to claim 1, wherein said fixed portion is a wall of said nozzle chamber.

4. The ink jet nozzle assembly according to claim 1, wherein an air breathing slot is located between said movable portion and said fixed portion.

5. An ink jet nozzle assembly including:
   a nozzle chamber having an inlet in fluid communication with an ink reservoir and a nozzle through which ink from said chamber can be ejected;
   the chamber including a fixed portion and a movable portion configured for relative movement in an ejection phase and alternate relative movement in a refill phase;
   the movable portion being formed in a first wall of said nozzle chamber and having one end traversing adjacent a second wall of said nozzle chamber, said second wall being substantially perpendicular to said first wall; and
   the inlet being positioned and dimensioned relative to the nozzle such that ink is ejected preferentially from the chamber through the nozzle in droplet form during the ejection phase, and ink is alternately drawn preferentially into the chamber from the reservoir through the inlet during the refill phase.

6. An assembly according to claim 5 wherein the movable portion includes the nozzle and the fixed portion is mounted on a substrate.

7. An assembly according to claim 5 wherein the fixed portion includes the nozzle mounted on a substrate and a movable portion includes an ejection paddle.

8. The assembly according to claim 5 wherein said one end of said first wall further includes a flange including a surface adjacent said second wall.

9. An assembly according to claim 8 wherein said flange is spaced from said second wall by a slot.

10. The assembly according to claim 5 wherein said second wall of said chamber forms one wall of said inlet.

11. An assembly according to claim 5 wherein said movable portion includes a thermal bend actuator.

12. An assembly according to claim 11 wherein said thermal bend actuator comprises a conductive heater layer between layers of a substantially non-conductive material having a higher coefficient of thermal expansion.

13. An assembly according to claim 12 wherein said conductive heater layer is arranged in a serpentine form so that, upon conductive heating of said conductive heater layer, said conductive heater layer forms a concertina so as to allow for substantially unhindered expansion of said substantially non-conductive material.

14. An assembly according to claim 12 wherein said substantially non-conductive material comprises substantially polytetra-fluoroethylene.

15. An assembly according to claim 5 formed on a silicon wafer.

16. An assembly according to claim 15 wherein said inlet is formed by back etching a back surface of said silicon wafer.

17. An assembly according to claim 16 wherein said back etching comprises a plasma etching of said back surface.

18. An assembly according to claim 15 wherein said silicon wafer is initially processed utilizing a CMOS processing system so as to form a electrical circuit required to operate said ink jet nozzle assembly on said silicon wafer.

19. An assembly according to claim 5 wherein said movable portion, in being actuated to be eject a drop of ink, restricts a flow of ink into said chamber via said inlet.

20. An assembly according to claim 5 further including a slot around a substantial portion of said movable portion, said slot interconnecting said nozzle chamber with an external ambient atmosphere, said slot being dimensioned to provide for fluid movement during operation of said movable portion while not allowing for the ejection of fluid therethrough.

* * * * *